US011144599B2

(12) United States Patent
Shagraev

(10) Patent No.: US 11,144,599 B2
(45) Date of Patent: Oct. 12, 2021

(54) METHOD OF AND SYSTEM FOR CLUSTERING DOCUMENTS

(71) Applicant: YANDEX EUROPE AG, Lucerne (CH)

(72) Inventor: Aleksey Galimovich Shagraev, Lyubertsy (RU)

(73) Assignee: YANDEX EUROPE AG, Lucerne (CH)

( * ) Notice: Subject to any disclaimer, the term of this patent is extended or adjusted under 35 U.S.C. 154(b) by 264 days.

(21) Appl. No.: 16/555,613

(22) Filed: Aug. 29, 2019

(65) Prior Publication Data

US 2020/0257728 A1    Aug. 13, 2020

(30) Foreign Application Priority Data

Feb. 8, 2019    (RU) .......................... RU2019103571

(51) Int. Cl.
 G06F 7/02     (2006.01)
 G06F 16/00    (2019.01)
     (Continued)

(52) U.S. Cl.
 CPC .......... G06F 16/906 (2019.01); G06F 16/93 (2019.01); *G06F 7/14* (2013.01); *G06F 16/285* (2019.01); *G06F 16/353* (2019.01); *G06F 16/45* (2019.01)

(58) Field of Classification Search
 CPC ...... G06F 16/906; G06F 16/93; G06F 16/285; G06F 16/353; G06F 16/367; G06F 16/45; G06F 7/14
 See application file for complete search history.

(56) References Cited

U.S. PATENT DOCUMENTS 6,654,739 B1    11/2003  Apte et al.
7,003,519 B1     2/2006  Biettron et al.
          (Continued)

FOREIGN PATENT DOCUMENTS

RU    20080119949 A    11/2009
WO      2008115053 A1    9/2008
WO      2014177050 A1   11/2014

OTHER PUBLICATIONS

Russian Search Report dated Mar. 22, 2021 issued in respect of the counterpart Russian Patent Application No. RU 2019103571.
(Continued)

*Primary Examiner* — Bruce M Moser
(74) *Attorney, Agent, or Firm* — BCF LLP

(57) ABSTRACT

There is provided a method and a system for generating clusters of documents using a combined metric parameter. A first document and a second document are received, and for a potential cluster including the first document and the second document: a first metric parameter indicative of a degree of complementariness of document content in the potential cluster is determined, a second metric parameter indicative of a degree of dilution of the document content in the potential cluster is determined. The combined metric parameter is determined based on the first metric parameter and the second metric parameter. A cluster is generated based on the combined metric parameter, where the cluster includes the first and second documents. Other document(s) or clusters may be added to the cluster by determining an updated combined metric parameter for a potential cluster and comparing the updated combined metric parameter with the combined metric parameter.

17 Claims, 6 Drawing Sheets

(51) Int. Cl.
*G06F 16/906* (2019.01)
*G06F 16/93* (2019.01)
*G06F 7/14* (2006.01)
*G06F 16/35* (2019.01)
*G06F 16/28* (2019.01)
*G06F 16/45* (2019.01)

(56) References Cited

U.S. PATENT DOCUMENTS

| | | | |
|---|---|---|---|
| 7,499,923 B2 | 3/2009 | Kawatani | |
| 7,539,653 B2 | 5/2009 | Handley | |
| 7,797,265 B2 | 9/2010 | Brinker et al. | |
| 7,844,566 B2 | 11/2010 | Wnek | |
| 8,046,363 B2 | 10/2011 | Cha et al. | |
| 8,200,670 B1 | 6/2012 | Flaster et al. | |
| 8,312,049 B2 | 11/2012 | Chayes et al. | |
| 8,458,194 B1* | 6/2013 | Procopio | G06F 16/35 707/749 |
| 8,635,225 B1 | 1/2014 | Jakubik | |
| 8,650,196 B1 | 2/2014 | Zhou et al. | |
| 8,832,105 B2 | 9/2014 | Punera et al. | |
| 9,002,848 B1 | 4/2015 | Peng et al. | |
| 2009/0070346 A1 | 3/2009 | Savona et al. | |
| 2012/0278321 A1* | 11/2012 | Traub | G06F 16/3331 707/736 |
| 2014/0280371 A1* | 9/2014 | Bastide | G06F 16/35 707/803 |
| 2015/0310000 A1 | 10/2015 | Schijvenaars et al. | |
| 2016/0378858 A1 | 12/2016 | Vadrevu et al. | |
| 2020/0242171 A1* | 7/2020 | Pogrebezky | G06F 16/906 |

OTHER PUBLICATIONS

"Determining The Optimal Number of Clusters: 3 Must Know Methods", http://www.sthda.com/english/articles/29-cluster-validation-essentials/96-determining-the-optimal-number-of-clusters-3-must-know-methods, retrieved on Aug. 22, 2019.

* cited by examiner

METHOD OF AND SYSTEM FOR CLUSTERING DOCUMENTS

CROSS-REFERENCE

The present application claims priority to Russian Patent Application No. 2019103571, entitled "Method of and System for Clustering Documents", filed Feb. 8, 2019, the entirety of which is incorporated herein by reference.

FIELD

The present technology generally relates to computer-based clustering of documents in general, and more particularly, to a method of and a system for clustering documents using a combined metric parameter.

BACKGROUND

With the growth of users accessing the Internet, a vast number of Internet based services have surfaced. Such services include, for example, search engine services (such as Yandex™, Google™, and the like), social network services (such as Facebook™), multimedia services (such as Instagram™ and YouTube™), and news aggregator services (such as Yandex.News™). The latter service has been particularly useful in allowing users to easily view news articles on one platform.

Digital news aggregation is a technology area of growing interests. Indeed, news is a very important part of the daily life, whether for a stock broker, a research scientist or a lawyer. News aggregation service allows the user to be exposed to the most current news, without the need of frequently visiting many separate websites (such as those associated with individual news agencies or individual newspapers) to see if the content has been potentially updated.

Generally speaking, news aggregation services may execute clustering algorithms to group together news documents related to each other for presentation to users. As an example, news documents may be grouped by subject, such as politics, business, sports, music, and the like. With the wide range of news sources available today, a particular news event may be described by a plurality of news sources, and may contain similar or slightly different information therein. As an example, an article relating to a new scientific breakthrough, such as the discovery of a new subatomic particle, may be presented by different news sources with different levels of complexity in their content, and a more specialized news source (such as a magazine targeted to science enthusiasts) could go more in details about the news item than a more popular news source (such as a tabloid targeted to a general public).

U.S. Pat. No. 8,312,049 B2 granted on Nov. 13, 2012 to Microsoft and titled "News group clustering based on cross-post graph" teaches constructing a weighted graph with a subset of the newsgroups represented as vertices of the graph and cross-postings between two newsgroups of the subset of newsgroups represented as edges between vertices corresponding to the two newsgroups.

U.S. Pat. No. 7,797,265 B2 granted on Sep. 14, 2010 to Siemens and titled "Document clustering that applies a locality sensitive hashing function to a feature vector to obtain a limited set of candidate clusters" teaches that documents from a data stream are clustered by first generating a feature vector for each document. A set of cluster centroids (e.g., feature vectors of their corresponding clusters) are retrieved from a memory based on the feature vector of the document using a locality sensitive hashing function. The centroids may be retrieved by retrieving a set of cluster identifiers from a cluster table, the cluster identifiers each indicative of a respective cluster centroid, and retrieving the cluster centroids corresponding to the retrieved cluster identifiers from a memory. Documents may then be clustered into one or more of the candidate clusters using distance measures from the feature vector of the document to the cluster centroids.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developer(s) of the present technology have appreciated at least one technical problem associated with the prior art approaches.

Developer(s) of the present technology have appreciated that for clustering articles originating from a plurality of news sources related to a single event, some prior art approaches need to analyze content of all of the articles, determine how similar the content is, determine how many articles are to be merged into a single cluster, and determine a name for the cluster.

Developer(s) of the present technology have also appreciated that a cluster containing a documents about a given topic or event may have redundant information therein, as two or more documents in the cluster may originate from different sources, and may describe the given topic or event similarly, without providing any supplementary useful information, thus resulting in a waste of time for a user, and a loss of bandwidth and battery on the client device, as by reading the two or more articles, the user may not have learned more information than he or she would have by reading a given one of the two or more articles.

Without wishing to be bound to any specific theory, embodiments of the present technology have been developed based on developers' appreciation that a clustering algorithm could be configured to execute merging of documents into clusters based on an evaluation metric that combines two other evaluation metrics. A clustering algorithm configured to cluster documents based on such an aggregated metric (or a "combined evaluation metric") could automatically generate clusters out of a plurality of documents, and group under a single cluster documents relating to a single event and/or topic. Such a combined evaluation metric could measure how content of documents in a given cluster is similar or complementary, while also considering how information in the given cluster is diluted. By determining the combined evaluation metric for a potential cluster including the given cluster documents and a new document, the combined evaluation metric could measure an effect on the complementariness of document content and on the dilution of document content if the new document was to be added to the given cluster, i.e. how the information of the new document to be added to the given cluster will dilute or make less precise the information on a topic and/or event covered by the other documents in the given cluster, while considering an effect on the redundancy of information present in the given cluster. For instance, such an approach could allow generating clusters such that the information provided by each documents in the cluster is complementary, thus maximizing the "total" information provided in the cluster, while also considering the redundancy or dilution of information in the cluster, thus minimizing the number of documents in the cluster. As a result, a user may only need to read fewer documents per cluster to obtain a good portion of the information contained in all of the plurality of documents that have been been clustered.

Further, developer(s) have also appreciated that such an approach may ameliorate the need to manually determine the final number of clusters, and may allow automatically stopping the clustering process.

Such a technology may allow saving resources on the server, by clustering document more efficiently, as well as saving bandwidth and resources such as battery on client devices, by providing more "representative" documents for a given topic or event to users, and thus preventing the need for users to browse through all documents to learn about a given topic or event.

While the present technology will be described in the context of news aggregation services providing news documents, it should be understood by a person skilled in the art that it could be applied to other types of digital documents that could be aggregated, such as, but not limited to music, videos, without departing the scope of the present technology.

According to a first broad aspect of the present technology there is provided a computer-implemented method for generating clusters of documents using a clustering algorithm, each cluster of the clusters of documents having documents that share at least one common topic, where the method is executable by a server, and where the server executes the clustering algorithm. The method comprises: receiving a first document and a second document, the first document and the second document having respective document content. The method determines for a potential cluster including the first document and the second document: an updated first metric parameter, the updated first metric parameter being indicative of a degree of complementariness of document content in the potential cluster if the first document and the second document were to be merged into the potential cluster, an updated second metric parameter, the updated second metric parameter being indicative of a degree of dilution of the document content in the potential cluster if the first document and the second document were to be merged into the potential cluster, and an updated combined metric parameter based on the first metric parameter and the second metric parameter. The method then generates based on the updated combined metric parameter, a cluster, the cluster including the first document and the second document.

In some embodiments of the method, the method further comprises, prior to the determining for the potential cluster the updated first metric parameter: determining, for each of the first document and the second document, a respective first metric parameter, a respective second metric parameter, and a respective combined metric parameter based on the respective first metric parameter and the respective second metric parameter, and wherein the generating the cluster is executed in response to the updated combined metric parameter of the potential cluster being above at least one of: the respective combined metric parameters of the first document, and the second document.

In some embodiments of the method, the method further comprises: storing, by the server, the updated combined metric parameter as the combined metric parameter of the cluster.

In some embodiments of the method, the cluster is a first cluster, the receiving comprises receiving a plurality of documents, each respective document of the plurality of documents having respective document content, the plurality of documents including the first document and the second document, the determining comprises determining a respective first metric parameter, a respective second metric parameter, and a respective updated combined metric parameter for each possible potential cluster including a respective pair of documents from the plurality of documents, and the generating based on the combined metric parameter the first cluster including the first document and the second document is further based on the updated combined metric parameter of the potential cluster including the first document and the second document being above the respective updated combined metric parameters of remaining potential clusters including the respective pair of documents from the plurality of documents.

In some embodiments of the method, the method further comprises: determining, by the server, for each potential cluster including documents from the first cluster and a respective remaining document of the plurality of documents: a respective updated first metric parameter, the respective updated first metric parameter being indicative of a degree of complementariness of document content in the potential cluster if the respective remaining document was to be merged with the documents of the first cluster into the potential cluster, a respective updated second metric parameter, the respective updated second metric parameter being indicative of a degree of dilution of the document content in the potential cluster if the respective remaining document was to be united with the documents of the first cluster into the potential cluster, and a respective updated combined metric parameter based on the respective updated first metric parameter and the respective updated second metric parameter, in response to a given one of the respective updated combined metric parameters being above the combined metric parameter of the first cluster, adding a third document to the first cluster, the third document being a remaining document of the plurality of documents having the given one of the respective updated combined metric parameters above the combined metric parameter of the first cluster if it was to be merged with the documents of the first cluster, and storing, by the server, the given one of the respective updated combined metric parameters as the combined metric parameter of the first cluster.

In some embodiments of the method, the method further comprises: based on all of the respective updated combined metric parameters being below the combined metric parameter of the first cluster, closing the first cluster without adding the third document.

In some embodiments of the method, the method further comprises: repeating the method for remaining documents of the plurality of documents until all of the respective updated combined metric parameters are below the combined metric parameter of the first cluster, and in response to all of the respective metric parameters being below the combined metric parameter of the first cluster, closing the first cluster.

In some embodiments of the method, the method further comprises: determining, by the server, for each potential cluster including a respective pair of remaining documents of the plurality of documents, the remaining documents not including the documents in the first cluster: a respective first metric parameter, the respective first metric parameter being indicative of a degree of complementariness of document content of the respective pair of remaining documents if they were to be merged into the potential cluster, a respective second metric parameter, the potential updated second metric parameter being indicative of a degree of dilution of the document content in the respective potential cluster if the respective pair of remaining documents were to be merged into the potential cluster, and a respective updated combined metric parameter based on the respective first metric parameter and the respective second metric parameter, generating, by the server, based on a given one of the respective updated combined metric parameters being above the respective updated combined metric parameters of remaining potential clusters, a second cluster, the second cluster including a pair of documents having the given one of the respective combined metric parameters if they were to be merged, and storing, by the server, the given one of the respective combined metric parameters as a combined metric parameter of the second cluster.

In some embodiments of the method, the method further comprises: determining, by the server, for each potential cluster including documents from the second cluster and a respective remaining document of the plurality of documents: a respective first metric parameter, the respective first metric parameter being indicative of a degree of complementariness of document content in the potential cluster if the respective remaining document was to be merged with documents of the second cluster, a respective second metric parameter, the respective second metric parameter being indicative of a degree of dilution of the document content in the potential cluster if the respective remaining document was to be merged with the documents of the second cluster, and a respective updated combined metric parameter based on the respective first metric parameter and the respective second metric parameter, adding, by the server, based on a given one of the respective updated combined metric parameters being above the combined metric parameter of the second cluster, a fourth document to the second cluster, the fourth document being a remaining document of the plurality of documents having the given one of the respective updated combined metric parameters above the combined metric parameter of the second cluster if it was to be merged with the documents of the second cluster, and storing, by the server, the given one of the respective updated combined metric parameters as the combined metric parameter of the second cluster.

In some embodiments of the method, the method further comprises repeating the method for remaining documents in the plurality of documents to obtain a set of clusters, the set of clusters including at least the first cluster, and the second cluster.

In some embodiments of the method, after receiving the plurality of documents, the method further comprises: generating, by the server, a respective document vector for each respective document of the plurality of documents based on at least a portion of the respective document content of the respective document, and wherein the determining the respective first metric parameter for the respective potential cluster is based on: respective distances between respective document vectors in the respective potential cluster, and wherein the determining the respective updated second metric parameter for the respective potential cluster is based on: the respective distances between respective document vectors in the respective potential cluster, and a respective size of the respective potential cluster.

In some embodiments of the method, the first document is a first cluster containing a plurality of first cluster documents, and the second document is a second cluster containing a plurality of second cluster documents.

In some embodiments of the method, the first cluster and the second cluster have a respective combined metric parameter, and wherein the generating the cluster is in response to the updated combined metric parameter being above both of: the respective combined metric parameter of the first cluster, and the respective combined metric parameter of the second cluster.

In some embodiments of the method, the method further comprises, in response to the combined metric parameter being below both of: the respective combined metric parameter of the first cluster, and the respective combined metric parameter of the second cluster: keeping the first cluster and the second cluster as separate clusters.

In some embodiments of the method, the determining the updated first metric parameter is further based on: respective distances between the respective document vectors of the first cluster, respective distances between the respective document vectors of the second cluster, and respective distances between the respective document vectors of the first cluster and the second cluster, and wherein the determining the updated second metric parameter for the respective potential cluster is based on: the respective distances between the respective document vectors of the first cluster, the respective distances between the respective document vectors of the second cluster, the respective distances between the respective document vectors of the first cluster and the second cluster, and a size of the potential cluster, the size of the potential cluster being a sum of respective sizes of the first cluster and the second cluster.

In some embodiments of the method, the respective document content includes: a respective title of the respective document, and a respective body content of the respective document.

According to another broad aspect of the present technology there is provided a system for generating clusters of documents using a clustering algorithm, each cluster of the clusters of documents having documents that share at least one common topic, the system comprising: a processor, a non-transitory computer-readable medium comprising instructions. The processor, upon executing the instructions, is configured to: receive a first document and a second document, where the first document and the second document have respective document content. The processor is configured to determine, for a potential cluster including the first document and the second document: an updated first metric parameter, the updated first metric parameter being indicative of a degree of complementariness of document content in the potential cluster if the first document and the second document were to be merged into the potential cluster, an updated second metric parameter, the updated second metric parameter being indicative of a degree of dilution of the document content in the potential cluster if the first document and the second document were to be merged into the potential cluster, and an updated combined metric parameter based on the updated first metric parameter and the updated second metric parameter. The processor is configured to generate, based on the combined metric parameter, a cluster, the cluster including the first document and the second document.

In some embodiments of the system, the processor is further configured to, prior to the determining for the potential cluster the updated first metric parameter: determine, for each of the first document and the second document, a respective first metric parameter, a respective second metric parameter, and a respective combined metric parameter based on the respective first metric parameter and the respective second metric parameter, and wherein the generating the cluster is executed in response to the combined metric parameter of the potential cluster being above: the respective combined metric parameters of the first document, and the second document.

In some embodiments of the system, the processor is further configured to: store the combined metric parameter as the combined metric parameter of the cluster.

In some embodiments of the system, the cluster is a first cluster, the receiving comprises receiving a plurality of documents, each respective document of the plurality of documents having respective document content, the plurality of documents including the first document and the second document, the determining comprises determining a respective first metric parameter, a respective second metric parameter, and a respective updated combined metric parameter for each possible potential cluster including a respective pair of documents from the plurality of documents, and the generating based on the combined metric parameter the first cluster including the first document and the second document is further based on the updated combined metric parameter of the potential cluster including the first document and the second document being above the respective updated combined metric parameters of remaining potential clusters including the respective pair of documents from the plurality of documents.

In some embodiments of the system, the processor is further configured to: determine for each potential cluster including documents from the first cluster and a respective remaining document of the plurality of documents: a respective updated first metric parameter, the respective updated first metric parameter being indicative of a degree of complementariness of document content in the potential cluster if the respective remaining document was to be merged with the documents of the first cluster into the potential cluster, a respective updated second metric parameter, the respective updated second metric parameter being indicative of a degree of dilution of the document content in the potential cluster if the respective remaining document was to be united with the documents of the first cluster into the potential cluster, and a respective updated combined metric parameter based on the respective updated first metric parameter and the respective updated second metric parameter, in response to a given one of the respective updated combined metric parameters being above the combined metric parameter of the first cluster, adding a third document to the first cluster, the third document being a remaining document of the plurality of documents having the given one of the respective updated combined metric parameters above the combined metric parameter of the first cluster if it was to be merged with the documents of the first cluster, and store the given one of the respective updated combined metric parameters as the combined metric parameter of the first cluster.

In some embodiments of the system, the processor is further configured to: based on all of the respective updated combined metric parameters being below the combined metric parameter of the first cluster, closing the first cluster without adding the third document.

In some embodiments of the system, the processor is further configured to: repeat the execution of the instructions for remaining documents of the plurality of documents until all of the respective updated combined metric parameters are below the combined metric parameter of the first cluster, and in response to all of the respective metric parameters being below the combined metric parameter of the first cluster, closing the first cluster.

In some embodiments of the system, the processor is further configured to: determine for each potential cluster including a respective pair of remaining documents of the plurality of documents, the remaining documents not including the documents in the first cluster: a respective first metric parameter, the respective first metric parameter being indicative of a degree of complementariness of document content of the respective pair of remaining documents if they were to be merged into the potential cluster, a respective second metric parameter, the potential updated second metric parameter being indicative of a degree of dilution of the document content in the respective potential cluster if the respective pair of remaining documents were to be merged into the potential cluster, and a respective updated combined metric parameter based on the respective first metric parameter and the respective second metric parameter, generate based on a given one of the respective updated combined metric parameters being above the respective updated combined metric parameters of remaining potential clusters, a second cluster, the second cluster including a pair of documents having the given one of the respective combined metric parameters if they were to be merged, and store the given one of the respective combined metric parameters as a combined metric parameter of the second cluster.

In some embodiments of the system, the processor is further configured to: determine for each potential cluster including documents from the second cluster and a respective remaining document of the plurality of documents: a respective first metric parameter, the respective first metric parameter being indicative of a degree of complementariness of document content in the potential cluster if the respective remaining document was to be merged with documents of the second cluster, a respective second metric parameter, the respective second metric parameter being indicative of a degree of dilution of the document content in the potential cluster if the respective remaining document was to be merged with the documents of the second cluster, and a respective updated combined metric parameter based on the respective first metric parameter and the respective second metric parameter, add, based on a given one of the respective updated combined metric parameters being above the combined metric parameter of the second cluster, a fourth document to the second cluster, the fourth document being a remaining document of the plurality of documents having the given one of the respective updated combined metric parameters above the combined metric parameter of the second cluster if it was to be merged with the documents of the second cluster, and store the given one of the respective updated combined metric parameters as the combined metric parameter of the second cluster.

In some embodiments of the system, the processor is further configured to repeat for remaining documents in the plurality of documents to obtain a set of clusters, the set of clusters including at least the first cluster, and the second cluster.

In some embodiments of the system, after receiving the plurality of documents, the processor is further configured to generate a respective document vector for each respective document of the plurality of documents based on at least a portion of the respective document content of the respective document, and wherein the determining the respective first metric parameter for the respective potential cluster is based on: respective distances between respective document vectors in the respective potential cluster, and wherein the determining the respective updated second metric parameter for the respective potential cluster is based on: the respective distances between respective document vectors in the respective potential cluster, and a respective size of the respective potential cluster.

In some embodiments of the system, the first document is a first cluster containing a plurality of first cluster documents, and the second document is a second cluster containing a plurality of second cluster documents.

In some embodiments of the system, the first cluster and the second cluster have a respective combined metric parameter, and wherein the generating the cluster is in response to the updated combined metric parameter being above both of: the respective combined metric parameter of the first cluster, and the respective combined metric parameter of the second cluster.

In some embodiments of the system, the processor is further configured to, in response to the combined metric parameter being below both of: the respective combined metric parameter of the first cluster, and the respective combined metric parameter of the second cluster: keeping the first cluster and the second cluster as separate clusters.

In some embodiments of the system, the determining the updated first metric parameter is further based on: respective distances between the respective document vectors of the first cluster, respective distances between the respective document vectors of the second cluster, and respective distances between the respective document vectors of the first cluster and the second cluster, and wherein the determining the updated second metric parameter for the respective potential cluster is based on: the respective distances between the respective document vectors of the first cluster, the respective distances between the respective document vectors of the second cluster, the respective distances between the respective document vectors of the first cluster and the second cluster, and a size of the potential cluster, the size of the potential cluster being a sum of respective sizes of the first cluster and the second cluster.

In some embodiments of the system, the respective document content includes: a respective title of the respective document, and a respective body content of the respective document.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
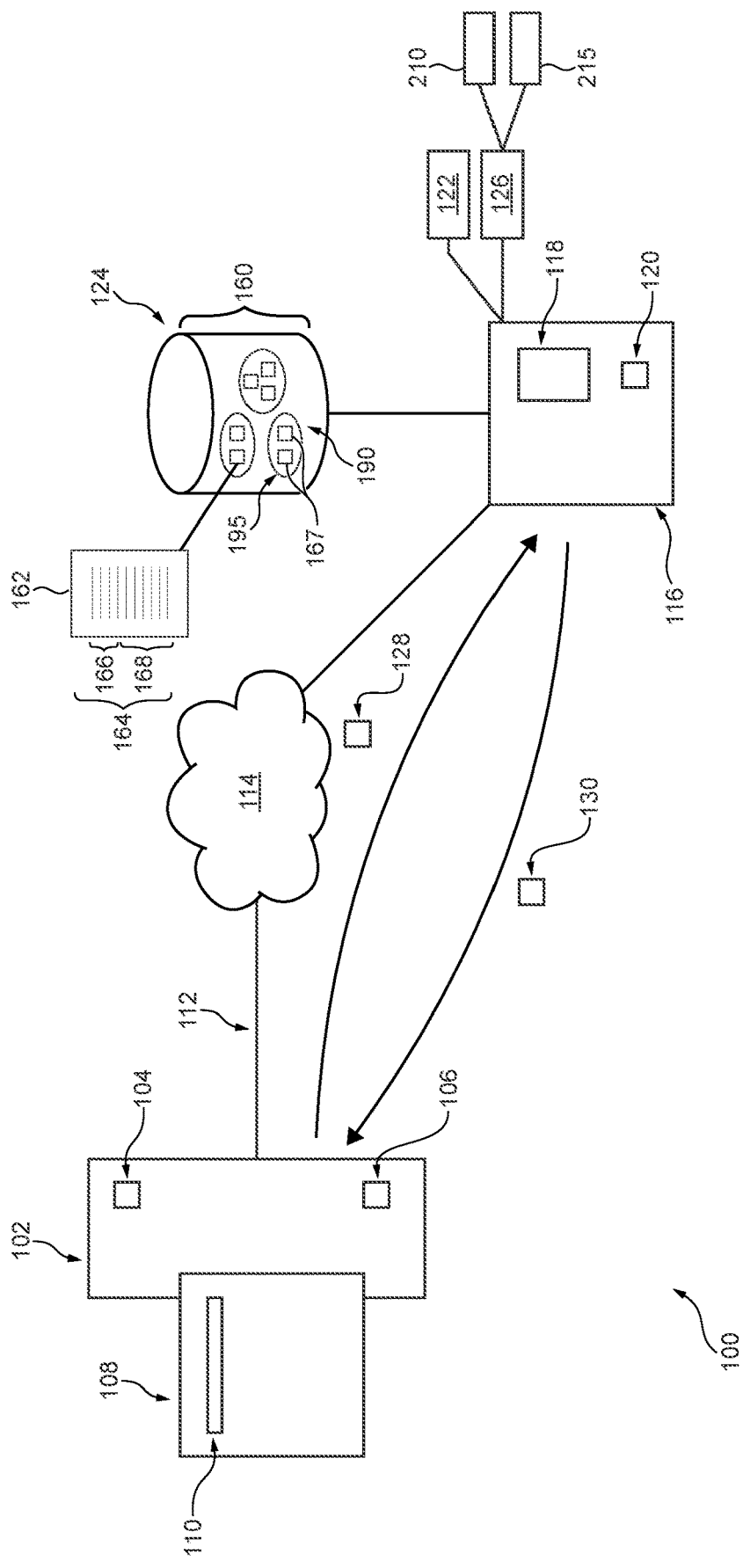
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 108. Generally speaking, the purpose of a browser application 108 is to enable the user (not depicted) to access one or more web resources. The manner in which the browser application 108 is implemented is known in the art and will not be described herein. Suffice to say that the browser application 108 may be one of Google™ Chrome™, Yandex.Browser™, or other commercial or proprietary browsers.

Irrespective of how the browser application 108 is implemented, the browser application 108, typically, has a command interface 110. Generally speaking, the user (not depicted) can access a web resource via a communication network by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

The electronic device 102 comprises a communication interface (not depicted) for two-way communication with a communication network 114 via a communication link 112. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 112 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 112 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 112 and the communication network 114 are provided for illustration purposes only. As such, those skilled in the art will easily appreciate other specific implementational details for the electronic device 102, the communication link 112, and the communication network 114. As such, by no means the examples provided hereinabove are meant to limit the scope of the present technology.

Server

The system 100 further includes a server 116 coupled to the communication network 114. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of the present technology, the server 116 is a single server. In alternative non-limiting embodiments of the present technology, the functionality of the server 116 may be distributed and may be implemented via multiple servers.

The server 116 comprises a communication interface (not depicted) structured and configured to communicate with various entities (such as the electronic device 102 and other devices potentially coupled to the communication network 114) via the communication network 114. Similar to the electronic device 102, the server 116 comprises a server memory 118 which comprises one or more storage media and generally provides a place to store computer-executable program instructions executable by a server processor 120. By way of example, the server memory 118 may be implemented as a tangible computer-readable storage medium including Read-Only Memory (ROM) and/or Random-Access Memory (RAM). The server memory 118 may also include one or more fixed storage devices in the form of, by way of example, hard disk drives (HDDs), solid-state drives (SSDs), and flash-memory cards.

In some embodiments, the server 116 can be operated by the same entity that has provided the afore-described browser application 108. For example, if the browser application 108 is a Yandex.Browser™, the server 116 can be operated by Yandex LLC of Lev Tolstoy Street, No. 16, Moscow, 119021, Russia. In alternative embodiments, the server 116 can be operated by an entity different from the one who has provided the aforementioned browser application 108.

In accordance with the present technology, the server 116 is configured to execute a news aggregator application 122, such as Yandex.News™ application. The news aggregator application 122 is configured to provide a news aggregator service that is accessible by the electronic device 102 via the communication network 114 to provide news content from multiple sources (not depicted).

In accordance with the non-limiting embodiments of the present technology, the server 116 is configured (for example, by means of programming code, software, hardware, firmware, or a combination therefor) to execute a clustering application 126. The manner in which the clustering application 126 is implemented will be described in detail herein below. For now, suffice to say that the clustering application 126 is configured to cluster digital documents (or simply "documents" for short) into clusters, where documents in a given cluster share a common topic and/or event. The clustering application 126 is configured to provide an indication of the clusters to the news aggregator application 122, such that the news aggregator application 122 groups documents being part of the same cluster in the news aggregator service that is accessible by the electronic device 102 via the communication network 114.

To that end, the server 116 is communicatively coupled to a news database 124 via a dedicated link (not numbered). In alternative implementations, the news database 124 may be communicatively coupled to the server 116 via the communication network 114 without departing from the teachings of the present technology. Although the news database 124 is illustrated schematically herein as a single entity, it is contemplated that the news database 124 may be configured in a distributed manner.

Plurality of Digital Documents

The news database 124 is populated with a plurality of digital documents 160. The nature of each of the plurality of digital documents 160 is not particularly limited. Broadly speaking, a given one of the one or more digital documents contains one or more sentences, images, videos, etc. The digital document can be, for example, a news document available on the Web, such as a CNN™ article about current world politics.

The manner in which the news database 124 is populated is not limited. Just as an example, the news database 124 may execute (or have access to) a crawling function (not depicted) configured to gather the plurality of digital documents 160 from selected news sources, such as websites of newspapers, online magazines, scientific journals, social media, other electronic news resources, and the like. Alternatively, the news database 124 may receive the plurality of digital documents 160 directly from various sources, without the use of a crawling function.

Generally speaking, each respective document 162 of the plurality of digital documents 160 includes respective document content 164, the respective document content 164 including: a respective title 166, and respective body content 168. The respective title 166 generally includes one or more words that are indicative of the respective body content 168 of the respective document 162. The respective body content 168 generally includes text body content, but could also include at least one of: text body content, video body content, audio body content, game body content, and the like. As a non-limiting example, a title of a digital document may be "Physicists discover new charming particle at the Large Hadron Collider", and the body content may include text content explaining the discovery of the new particle, as well as one or more pictures of the physicists having discovered the new particle.

After the execution of a clustering procedure by the clustering application 126, which will be explained in more detail herein below, each respective document 162 of the plurality of digital documents 160 may be associated with a respective cluster 195 of the set of clusters 190, where each respective cluster 195 includes a respective subset of documents 167 of the plurality of digital documents 160, and is indicative of a given topic and/or event, as determined by the clustering application 126. How the plurality of digital documents 160 are linked to a given one of the set of clusters 190 in the news database 124 is not limited. As an example, each respective document 162 may be associated with a cluster identifier (not depicted) such that the news aggregator application 122 groups portions of the plurality of digital documents 160 sharing the same cluster identifier in the news aggregator service for presentation to the user of the electronic device 102.

Figure 2:
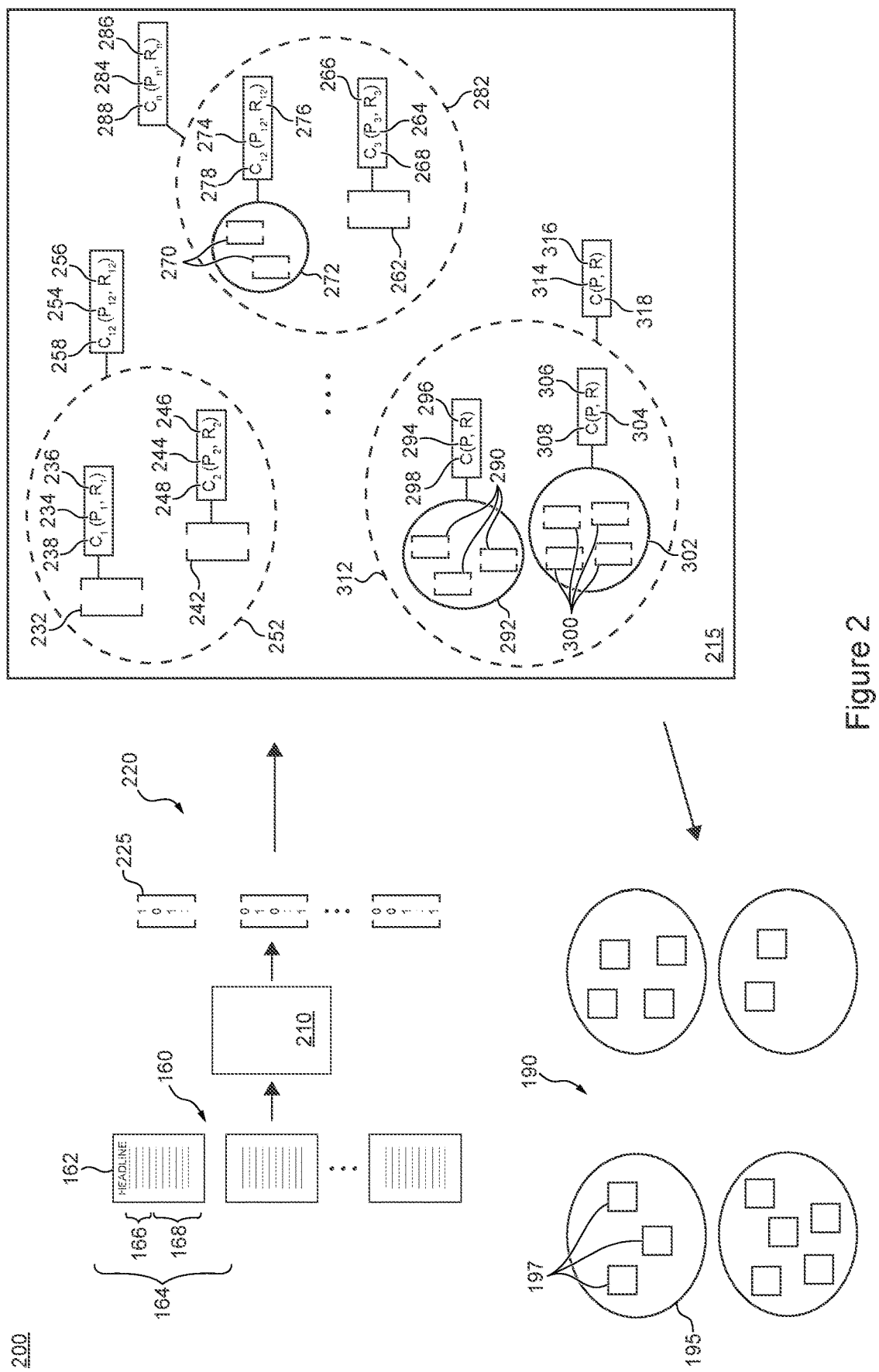
FIG. 2 depicts a schematic diagram of a clustering procedure executed by a clustering application within the system of FIG. 1, the clustering application being implemented in accordance with non-limiting embodiments of the present technology.

Now turning to FIG. 2, there is depicted a schematic diagram of a clustering procedure 200 executed by the clustering application 126 in accordance with non-limiting embodiments of the present technology.

Clustering Application

Generally speaking, the clustering application 126 is configured to execute the clustering procedure 200 for clustering the plurality of digital documents 160 into the set of clusters 190, where each respective cluster 195 of the set of clusters 190 includes one or more of the plurality of digital documents 160, and where each respective cluster 195 is indicative of a given event and/or topic. After execution of the clustering procedure 200, the clustering application 126 is configured to transmit an indication of the plurality of digital documents 160 (where each respective document 162 is associated with a given cluster of the set of clusters 190) to the news aggregator application 122 which may in turn provide one or more of the plurality of digital documents 160 sorted by respective clusters to the news aggregator service for presentation to the user of the electronic device 102, the news aggregator service being accessible by the electronic device 102 via the communication network 114.

The clustering application 126 may execute the clustering procedure 200 upon receiving an indication to cluster the plurality of digital documents 160, and/or may execute the clustering procedure 200 at predetermined intervals of time. In some embodiments, the clustering application 126 may execute the clustering procedure 200 after acquiring a predetermined number of documents in the news database 124.

To execute the clustering procedure 200, the clustering application 126 is configured to execute a vector generation procedure 210 and a clustering algorithm 215.

Vectorization Procedure

The clustering application 126 executes the vector generation procedure 210 to generate a plurality of documents vectors 220, where each respective document vector 225 of the plurality of documents vectors 220 represents at least a portion of the respective document content 164 of the respective document 162 of the plurality of digital documents 160.

Generally, the purpose of the vector generation procedure 210 is to represent a document as a vector of real numbers in a multidimensional space by using a set of language modeling and features learning techniques in natural language processing (NLP), such that documents can be matched and compared with each other via their vectors, as an example by determining a distance between the vectors, which may be indicative of a degree of similarity or relatedness.

The manner in which the vector generation procedure 210 represents a respective document 162 as a respective document vector 225 is not limited, and some examples of algorithms that may be executed by the vector generation procedure 210 include, but are not limited to: word2vec, doc2vec, GloVe, sense2vec, wang2vec, and Latent Dirichlet Allocation (LDA). In some embodiments, the vector generation procedure 210 may execute a machine learning algorithm (MLA) having been trained to generate the plurality of document vectors 220, such as, but not limited to a neural network (NN).

The vector generation procedure 210 determines a respective document vector 225 for each respective document 162 of the plurality of digital documents 160 based on at least a portion of the respective document content 164 of the respective document 162. In the illustrated embodiment, the vector generation procedure 210 determines the respective document vector 225 based on the respective title 166 of the respective document 162. Additionally, or alternatively, it is contemplated that the vector generation procedure 210 could generate the respective document vector 225 based on at least a portion of the respective body content 168 of the respective document 162.

The clustering application 126 may store each respective document vector 225 in association with an indication of the respective document 162 it represents as an example in the server memory 118, the news database 124 or another volatile or non-volatile memory (not depicted).

After having generated the respective document vector 225 for each of the respective documents 162 of the plurality of digital documents 160, the plurality of document vectors 225 are received as an input by the clustering algorithm 215 of the clustering application 126 for the clustering of the plurality of digital documents 160.

Clustering Algorithm

Generally speaking, the purpose of the clustering algorithm 215 is to generate the set of clusters 190, where each of the respective clusters 195 includes one or more of the plurality of digital documents 160, based on the plurality of document vectors 220. To achieve that purpose, the clustering algorithm 215 is configured to generate: (i) a first metric parameter; (ii) a second metric parameter; and (iii) a combined metric parameter based on the first metric parameter, and the second metric parameter.

It should be noted that in the context of the present technology, the clustering algorithm 215 is configured to cluster documents and/or clusters into a single cluster based on the combined metric parameter. Thus, it may be said that the clustering algorithm 215 does not differentiate between clustering two documents into a single cluster, clustering a document and a cluster into a single cluster, and clustering two clusters into a single cluster, where each cluster includes two or more documents, i.e. the clustering is based on the combined metric parameter, which may be generated for both documents and for clusters.

First Metric Parameter

The clustering algorithm 215 is configured to generate the first metric parameter. The first metric parameter for a given cluster is generally a measure of a degree of complementariness of documents in the given cluster, measured based on the respective document vectors 225 in the given cluster. Thus, the first metric parameter is an evaluation metric assessing, for the given cluster, based on the respective document vectors 225: (i) how similar the documents in the given cluster are, and (ii) how much additional information the documents in the given cluster provide to each other. In other words, it may be said that the first metric parameter measures a "breadth" of coverage of the given topic by the content of the documents of the given cluster.

Generally, the clustering algorithm 215 is configured to generate:

(i) a respective first metric parameter for a first object (not depicted) and a second object (not depicted) to be potentially merged into a single cluster, where: (a) the first object may be a given cluster including given cluster documents, or a single given document, and (b) the second object may be another given cluster including other documents, or another single given document, where the respective first metric parameter is indicative of a respective degree of complementariness of respective document content in the first object and the second object; and (ii) a respective updated first metric parameter for a potential cluster, the potential cluster including the first object and the second object, where the updated first metric parameter is indicative of a degree of complementariness of document content in the potential cluster including the first object and the second object.

Put another way, the updated first metric parameter is the "new" or updated first metric parameter value of the first object, if the second object was to be added to or merged in a cluster with the first object (or vice versa), while the respective first metric parameters are the respective current values of the first metric parameter of the first object and the second object. Thus, an increase in the first metric parameter (i.e. an updated first metric parameter that is above the respective first metric parameter) is indicative of a increase in a degree of complementariness of document content in the first object, if the second object was to be added to the first object (or vice versa), which may indicate that document(s) in the first object and document(s) in the second object are complementary to each other in terms of their content, and if grouped together, they may provide additional information about a given topic or event. The higher the first metric parameter for a cluster is, the easier it is for a user to understand the document content in the cluster by reading a given document in the cluster. Thus, the higher the updated first metric parameter of two documents to be merged in a cluster, the "richer" the combined content of the two documents to the topic of the cluster is.

In contrast, a decrease in the first metric parameter (i.e. an updated first metric parameter that is below the respective first metric parameter) is indicative of a decrease in a degree of complementariness of document content in the first object if the second object was to be added to or merged in a cluster with the first object (or vice versa), which may indicate that document(s) in the first object and document(s) in the second object are less complementary to each other in terms of their content, and if grouped together, they may not provide additional information about a given topic or event. The lower the updated first metric parameter is, the harder it is for a user to understand the document content in the cluster by reading a given document in the cluster.

The clustering algorithm 215 may assign a predetermined value to the first metric parameter for a single document, which may be 1, i.e. the single document has a 100% degree of complementarines s.

The manner in which the clustering algorithm 215 determines the first metric parameter for a given cluster based on the document vectors representing documents in the given cluster is not limited. As a non-limiting example, the clustering algorithm 215 may determine, for the potential cluster including the given cluster documents and the new document, the updated second metric parameter based on: a distance between each pair of document vectors in the potential cluster (which includes a document vector representing the other document and document vectors representing the given cluster documents). In some embodiments of the present technology, to determine the updated first metric parameter, the clustering algorithm 215 may aggregate the document vectors representing the given cluster documents in the given cluster to obtain an aggregated document vector, and may determine the updated first metric parameter based on a distance between the aggregated document vector and the document vector representing the other document.

In some embodiments of the present technology, the first metric parameter may be determined, for a given document in a subset of documents, by equation (1):

$$P(d) = \frac{1}{|D_i|} \sum_{d_i' \in D_i} w(d, d_i) \qquad (1)$$

Where $P(d)$ is the first metric parameter of a given document vector d (representing the given document) part of a subset of document vectors $D_i \in D$, $w(d,d_i)$ is a function measuring a distance between the given document vector d and another document vector $d_i$ part of the subset of document vectors $D_i$. As a non-limiting example, $w(d,d_i)$ may vary from 0 to 1.

The first metric parameter for the subset of documents may be determined by computing an average of the first metric parameters of documents in the subset represented by equation (2)

$$P(D_i) = \frac{1}{|D_i|} \sum_{d \in D_i} P(d) \qquad (2)$$

Second Metric Parameter

The clustering algorithm 215 is configured to generate the second metric parameter. The second metric parameter for a given cluster is generally a measure of a degree of dilution of document content of documents in the given cluster to the document content of all remaining documents of the plurality of documents, measured based on the respective document vectors 225. Generally, the second metric parameter measures how the first metric parameter (i.e. degree of complementariness) depends on the size of the cluster. In other words, the second metric parameter is indicative of how addition of a new document to the given cluster (or to another document) would dilute the overall cluster content relative to the topic of the cluster.

The more documents a given cluster contains, the more documents a user needs to read to understand the topic of the given cluster, and the more challenging it is for the clustering algorithm 215 to measure the first metric parameter, as document vectors in the given cluster need to be compared to each other. The second metric parameter measures how concentrated (or diluted) the document content in the given cluster is, and it may be said that the second metric parameter measures how much information is "lost" in a given cluster by not including a given document in the given cluster.

Generally, the clustering algorithm 215 is configured to generate:

(i) a respective second metric parameter for a first object (not depicted) and a second object (not depicted) objects to be potentially merged into a single cluster, where a first object (not depicted) may be: (a) a given cluster including given cluster documents, or a single given document; and a second object (not depicted) may be: (b) another cluster including other documents, or another single document, and where the respective second metric parameter is indicative of a degree of dilution of document content in the first object and the second object, respectively and (ii) an updated second metric parameter for a potential cluster, the potential cluster including the first object and the second object, where the updated second metric parameter is indicative of a degree of dilution of document content in a cluster including the first object and the second object.

Put another way, the updated second metric parameter is the "new" or "updated" second metric parameter value of the first object, if the second object was to be added to or merged in a cluster with the first object (or vice versa), while the respective second metric parameters are the respective current values of the second metric parameter of the first object and the second object. Thus, an increase in the second metric parameter (i.e. an updated second metric parameter that is above the respective second metric parameter) is indicative of a decrease in a degree of dilution of document content in the first object if the second object was to be added to the first object (or vice versa), which may indicate that document(s) in the first object and document(s) in the second object, if grouped together, would also make information on a topic or event more precise (i.e. less diluted or more concentrated).

In contrast, a decrease in the second metric parameter (i.e. an updated second metric parameter that is below the respective second metric parameter) is indicative of an increase in a degree of dilution of document content in the first object if the second object was to be added to or merged in a cluster with the first object (or vice versa), which may indicate that document(s) in the first object and document(s) in the second object, if grouped together, would make information on a topic or event less precise (i.e. more diluted).

The clustering algorithm 215 may assign a predetermined value to the second metric parameter for a single document, which may be 0.

The manner in which the clustering algorithm 215 determines the second metric parameter is not limited. As an example, the clustering algorithm 215 may determine, for the potential cluster including the given cluster documents and the new document, the updated second metric parameter based on: a distance between each pair of document vectors in the potential cluster (which includes the document vector of the other document and the document vectors of the given cluster documents), a distance between the document vectors in the potential cluster and the remaining document vectors (which may or may not be part of other clusters), and a size of the potential cluster.

In some embodiments of the present technology, the second metric parameter for a given document in a subset of documents may be determined by equation (3):

$$R(d) = \frac{\sum_{d' \in D_i} w(d, d_i)}{\sum_{d' \in D} w(d, d_i)} \quad (3)$$

Where R (d) is the second metric parameter of a given document vector d part of a subset of documents vectors $D_i$, $w(d, d_i)$ is a function measuring a distance between the given document vector d and another document vector $d_i$ part of the subset of document vectors $D_i$, d' is a given document part of the set of all documents vectors D and $w(d, d_i)$ is a function measuring a distance between the given document vector d part of the subset of document vectors $D_i$ and the given document vector d' part of the set of all documents vectors D.

And the second metric parameter for a subset of documents can be computed as an average of the second metric parameters of the documents in the subset of document.

$$P(D_i) = \frac{1}{|D_i|} \sum_{d \in D_i} R(d) \quad (4)$$

Combined Metric Parameter

The clustering algorithm 215 is configured to generate the combined metric parameter for a given cluster based on the first metric parameter and the second metric parameter. The combined metric parameter for a given cluster is generally a simultaneous measure of a degree of complementariness and a degree of dilution of document content of documents in the given cluster.

Generally, the clustering algorithm 215 is configured to generate:

(a) a respective combined metric parameter for a first object (not depicted) and a second object (not depicted) objects to be potentially merged into a single cluster, where (i) the first object may be a given cluster including given cluster documents, or a single given document, and (ii) the second object (not depicted) may be another given cluster including other documents, or another single given document, where the respective combined metric parameter is generated based on the respective first metric parameter and the respective second metric parameter; and (b) an updated combined metric parameter for a potential cluster, the potential cluster including the first object and the second object, where the updated combined metric parameter is generated based on the updated first metric parameter and the updated second metric parameter.

To put it another way, the updated combined metric parameter is the "new" or "updated" combined metric parameter value of the first object, if the second object was to be added to or merged in a cluster with the first object (or vice versa), while the respective combined metric parameters are the respective current values of the combined metric parameter of the first object and the second object.

Thus, to determine if the first object and the second object should be merged into a single cluster, the clustering algorithm 215 is configured to compare the combined metric parameters (i.e. compare the updated combined metric parameter with the respective combined metric parameters).

An increase in the combined metric parameter (i.e. an updated combined metric parameter that is above the respective combined metric parameter) is simultaneously indicative of a increase in a degree of complementariness of document content, and a decrease in degree of dilution of document content in the first object if the second object was to be added to the first object (or vice versa). An updated combined metric parameter above the respective combined metric parameters may indicate that:

(i) the updated first metric parameter is above the respective first metric parameters, which indicates that the degree of complementariness of the document content in the potential cluster is above the individual degrees of complementariness of the document content in each of the first object and the second object, and the updated second metric parameter is above the respective second metric parameters, which indicates that the degree of dilution of the document content in the potential cluster is below the individual degree of dilution of the document content in each of the first object and the second object. Thus, the clustering algorithm 215 should generate a cluster including the two objects, as the documents in two objects provide additional information to each other, without being too repetitive (i.e. diluted).

(ii) the updated first metric parameter is above the respective first metric parameters, which indicates that the degree of complementariness of the document content in the potential cluster is above the individual degree of complementariness of the document content in each of the first object and the second object, and the updated second metric parameter is below the respective second metric parameters, which means that the degree of dilution of the document content in the potential cluster is below the individual degree of dilution of the document content in each of the first object and the second object, but that the increase in the degree of complementariness compensates for the decrease in the degree of dilution. Thus, the clustering algorithm 215 should generate a cluster including the two objects.

In some embodiments of the present technology, if the updated combined metric parameter for the potential cluster of two objects is equal to both of the respective metric parameters, the clustering algorithm 215 may be configured to not cluster the two objects. In other embodiments, the clustering algorithm 215 may generate a cluster including the two objects.

A decrease in the combined metric parameter (i.e. an updated combined metric parameter that is below one of the respective combined metric parameter) is simultaneously indicative of a decrease in a degree of complementariness of document content, and an increase in degree of dilution of document content in the first object if the second object was to be added to the first object (or vice versa), which may indicate that:

(i) the updated first metric parameter is below the respective first metric parameters, which indicates that the degree of complementariness of the document content in the potential cluster is below the individual degrees of complementariness of the document content in each of the first object and the second object, and the updated second metric parameter is below the respective second metric parameters, which indicates that the degree of dilution of the document content in the potential cluster is above the individual degree of dilution of the document content in each of the first object and the second object. Thus, the clustering algorithm 215 should not generate a cluster including the two objects, as the document contents of the documents in each of the first object and the second object are not complementary, and would dilute the subject of the cluster.

(ii) the updated first metric parameter is above the respective first metric parameters, which means that the degree of complementariness of the document content in the potential cluster is above the individual degree of complementariness of the document content in each of the first object and the second object, and the updated second metric parameter is below the respective second metric parameters, which indicates that the degree of dilution of the document content in the potential cluster is below the individual degrees of dilution of the document in each of the first object and the second object, but the increase in the degree of complementariness does not compensate for the decrease in the degree of dilution. Thus, the clustering algorithm 215 should not generate a cluster including the two objects as while the document content of the documents in each of the first object and the second object is complementary, the document content of a cluster including the first object and the second object would dilute the subject of the cluster.

The manner in which the combined metric parameter is generated based on the first metric parameter and the second metric parameter is not limited. In some embodiments, the combined metric parameter may be generated by multiplying the first metric parameter and the second metric parameter. In other embodiments, the combined metric parameter may be a function depending on the first metric parameter and the second metric parameter.

In some embodiments of the present technology, the combined metric parameter for a subset of documents (i.e. a potential cluster) may be determined by formula (5):

$$C(P(D_i),R(D_i))=R(D_i)^\alpha \cdot P(D_i) \qquad (5)$$

Where $C(P(D_i), R(D_i))$ is the combined metric parameter, $P(D_i)$ is the first metric parameter for a subset of document vectors $D_i$, $R(D_i)$ is the second metric parameter for the subset of document vectors $D_i$, and $\alpha$ is a constant. A value of the constant $\alpha$ determines an influence of the second metric parameter in the combined metric parameter i.e., how much importance to give to the degree of dilution of document content in the given cluster.

As an example, if $\alpha=1$, the first metric parameter and the second metric parameter have an equal influence, and the combined metric parameter may be computed by multiplying the first metric parameter, and the second metric parameter.

Having explained how the clustering application 126 determines the combined metric parameter based on the first metric parameter, and the second metric parameter using the clustering algorithm 215, we shall now give three non-limiting examples of a clustering procedure 200.

Clustering of Two Documents into a Single Cluster

As a first non-limiting example, the clustering algorithm 215 determines if a given document (not depicted) and another given document (not depicted) of the plurality of digital documents 160 should be potentially united to form a single cluster.

The clustering algorithm 215 determines, for a given document vector 232 representing the given document, a respective first metric parameter 234. The clustering algorithm 215 determines, for the given document vector 232 representing the given document, a respective second metric parameter 236. In some embodiments of the present technology, the clustering algorithm 215 may assign a predetermined value of 1 to the respective first metric parameter 234 and a predetermined value of 0 to the respective second metric parameter 236, as they are determined for single documents.

The clustering algorithm 215 determines, for the given document vector 232 representing the given document, a respective combined metric parameter 238 based on the respective first metric parameter 234 and the respective second metric parameter 236. In some embodiments of the present technology, the clustering algorithm 215 may directly assign a predetermined value of 0 to the respective combined metric parameter 238 of the given document vector 232, as it is determined for a single document.

The clustering algorithm 215 determines, for the other document vector 242 representing the other given document, a respective first metric parameter 244. The clustering algorithm 215 determines, for the other document vector 242 representing the second document, a respective second metric parameter 246. In some embodiments of the present technology, the clustering algorithm 215 may assign a predetermined value of 1 to the respective first metric parameter 244 and a predetermined value of 0 the respective second metric parameter 246 as they are determined for single documents.

The clustering algorithm determines, for the other document vector 242 representing the other document, a respective combined metric parameter 248 based on the respective first metric parameter 244 and the respective second metric parameter 246. In some embodiments of the present technology, the clustering algorithm 215 may directly assign a predetermined value of 0 to the respective combined metric parameter 248 of the other given document vector 242, as it is determined for a single document.

The clustering algorithm 215 determines, for the potential cluster 252, based on the given document vector 232 and the other given document vector 242, an updated first metric parameter 254, the updated first metric parameter 254 being indicative of a degree of complementariness of the given document vector 232 and the other given document vector 242. In some embodiments of the present technology, the clustering algorithm 215 may generate the updated first metric parameter 254 based on a distance between the given document vector 232 and the other given document vector 242.

The clustering algorithm 215 then determines, for the potential cluster 252 including the given document vector 232 and the other given document vector 242, an updated second metric parameter 256, the updated second metric parameter 256 being indicative of a degree of dilution of content in the potential cluster 252. In some embodiments of the present technology, the clustering algorithm 215 may generate the updated second metric parameter 256 based on: a distance between the given document vector 232 and the other given document vector 242, and a size of the potential cluster 252. Additionally, the clustering algorithm 215 may compute the updated second metric parameter 256 further based on a distance between the given document vector 232 and each of the remaining document vectors (not depicted) of the plurality of documents vectors 220, and a distance between the other given document vector 242 and each of the remaining document vectors of the plurality of documents vectors 220.

The clustering algorithm 215 then determines, for the potential cluster 252 including the given document vector 232 and the other given document vector 242, an updated combined metric parameter 258 based on the updated first metric parameter 254 and the updated second metric parameter 256, the updated combined metric parameter 258 being indicative of a degree of complementariness and dilution of content in the potential cluster 252. If the updated combined metric parameter 258 is above at least one of the respective combined metric parameters 238 and the respective combined metric parameter 248, this may indicate that and the given document and the other given document (represented respectively by the given document vector 232 and the other document vector 242) should be merged into a single cluster, as they provide complementary information to each other and do not dilute the topic of the single cluster (as opposed to the given document and the other given document not being merged into the single cluster). On the opposite, if the updated combined metric parameter 258 is below at least one of the respective combined metric parameter 238 and the respective combined metric parameter 248, this may indicate that the given document and the other given document should not be part of a single cluster, and should be kept apart, as they do not provide complementary information to each other and/or dilute the topic of the single cluster they would form (as opposed to the given document and the other given document not being merged into the single cluster).

In this non-limiting example, the clustering algorithm 215 determines that the updated combined metric parameter 258 is above both of the respective combined metric parameters 238, which is equal to 0, and generates a cluster 272. The clustering algorithm 215 generates a cluster 272 from the potential cluster 252, the cluster 272 including cluster document vectors 270 (i.e. the given document vector 232 and the other given document vector 242) representing respectively a first document and a second document (i.e. the given document and the other given document). The clustering algorithm 215 stores the updated combined metric parameter 258 as a combined metric parameter 278 of the cluster 272. In some embodiments, the clustering algorithm may also store the updated first metric parameter 254 and the updated second metric parameter 256 respectively as a first metric parameter 274 and a second metric parameter 276 of the cluster 272.

It should be noted that the clustering algorithm 215 may execute the procedure for each possible pair of documents (represented by respective document vectors 225) from the plurality of digital documents 160.

Clustering of a Single Document and a Cluster into a Single Cluster

As a second non-limiting example, the clustering algorithm 215 may determine if a third document (not depicted) of the plurality of digital documents 160 should be merged with the first document and the second document in the cluster 272.

The clustering algorithm 215 determines, for a third document vector 262 representing the third document, a respective first metric parameter 264, which may be assigned a predetermined value of 1. The clustering algorithm 215 determines the respective second metric parameter 266, which may be assigned a predetermined value of 0. The clustering algorithm 215 determines the respective combined metric parameter 268 of the third document vector 262 based on the respective first metric parameter 264 and the respective second metric parameter 266. In some embodiments of the present technology, the clustering algorithm 215 may directly assign a predetermined value of 0 the respective combined metric parameter 268 as it is determined for a single document.

The clustering application 126 retrieves the combined metric parameter 278 of the cluster 272 from the server memory 118, the news database 124 or another volatile or non-volatile memory (not depicted).

The clustering algorithm 215 then determines, for a second potential cluster 282, based on the given cluster document vectors 270 and the third document vector 262, an updated first metric parameter 284. In some embodiments of the present technology, the clustering algorithm 215 may determine the updated first metric parameter 284 based on: a distance between each of the given cluster document vectors 270, a distance between the third document vector 262 and each of the given cluster document vectors 270.

The clustering algorithm 215 determines, for a second potential cluster 282, based on the given cluster document vectors 270 and the third document vector 262, an updated second metric parameter 286. In some embodiments of the present technology, the clustering algorithm 215 may determine the updated second metric parameter 286 based on: the distance between each of the given cluster document vectors 270, the distances between the third document vector 262 and each of the given cluster document vectors 270, and a size of the second potential cluster 282. Additionally, the clustering algorithm 215 may determine the updated second metric parameter 286 further based on the distances between the third document vector 262 and each of the remaining document vectors of the plurality of documents vectors 220, and the distances between each of the given cluster document vectors 270 and each of the remaining document vectors of the plurality of documents vectors 220.

The clustering algorithm 215 then determines, for the second potential cluster 282 including the given cluster document vectors 270 and the third document vector 262, an updated combined metric parameter 288 based on the updated first metric parameter 284 and the updated second metric parameter 286.

The clustering algorithm 215 compares the updated combined metric parameter 288 with the respective combined metric parameter 268 of the third document vector 262 and the combined metric parameter 278 of the cluster 272.

If the updated combined metric parameter 288 is above at least one of the respective combined metric parameter 268 and the combined metric parameter 278, this may indicate that and the third document (represented by the third document vector 262) should be merged into the cluster 272, as the third document provides complementary information to the first document and the second document in the cluster 272, and does not dilute the topic of the cluster 272 (as opposed to the third document not being merged into the cluster 272). On the opposite, if the updated combined metric parameter 288 is below at least one of the respective combined metric parameter 268 and the combined metric parameter 278, this may indicate that the third document should not be added to the cluster 272, as the third document does not provide complementary information to the first document and the second document in the cluster 272 and/or dilutes information in the cluster 272 (in contrast with the cluster 272 if it only included the first document and the second document).

In this non-limiting example, the clustering algorithm 215 determines that the updated combined metric parameter 288 is above both of the combined metric parameter 278 of the first cluster 272, and above the respective combined metric parameter 268 of the third document vector 262, which is equal to 0. The clustering algorithm 215 adds the third document (represented by the third document vector 262) to generate the first cluster 292.

The clustering algorithm 215 stores the updated combined metric parameter 288 as a combined metric parameter 298 of the first cluster 292. In some embodiments, the clustering algorithm may also store the updated first metric parameter 284 and the updated second metric parameter 286 respectively as a first metric parameter 294 and a second metric parameter 296 of the first cluster 292.

Clustering of Two Clusters into a Single Cluster

As a third non-limiting example, the clustering algorithm 215 may determine if the first cluster 292 including first cluster documents (i.e. the first document, the second document and the third document), represented by the first cluster document vectors 290 (i.e. the given document vector 232, the other given document vector 242 and the third document vector 262) should be united with a second cluster 302 including second cluster document vectors 300 representing second cluster documents (not depicted). The second cluster 302 may have been previously generated by the clustering algorithm 215 in a manner similar to how the first cluster 292 was generated, and the second cluster 302 including at least two documents represented by the second cluster document vectors 300.

The clustering application 126 retrieves the combined metric parameter 298 of the first cluster 292 from the server memory 118, the news database 124 or another volatile or non-volatile memory (not depicted). In some embodiments, the clustering application 126 may retrieve the first metric parameter 294 and the second metric parameter 296 and generate the combined metric parameter 298 based on the first metric parameter 294 and the second metric parameter 296.

The clustering application 126 retrieves the combined metric parameter 308 of the second cluster 302 from the server memory 118, the news database 124 or another volatile or non-volatile memory (not depicted). In some embodiments, the clustering application 126 may retrieve the first metric parameter 304 and the second metric parameter 306 and generate the combined metric parameter 308 of the second cluster 302 based on the first metric parameter 304 and the second metric parameter 306.

The clustering algorithm 215 then determines, for a third potential cluster 312 including the first cluster 292 and the second cluster 302, based on the first cluster document vectors 290 and the second cluster document vectors 300, an updated first metric parameter 314, the updated first metric parameter 314 being indicative of a degree of complementariness of the first cluster documents and the first cluster documents if they were to be merged into a single cluster. In some embodiments of the present technology, the clustering algorithm 215 may determine the updated first metric parameter 314 based on: a distance between each of the first cluster document vectors 290, a distance between each of the second cluster document vectors 300, and a distance between each of the first cluster document vectors 290 and each of the second cluster document vectors 300.

The clustering algorithm 215 then determines, for the third potential cluster 312 including the first cluster 292 and the second cluster 302, based on the first cluster document vectors 290 and the second cluster document vectors 300, an updated second metric parameter 316, the updated second metric parameter being indicative of a degree of dilution of document content in if the first cluster documents and the first cluster documents if they were to be united into the single cluster.

In some embodiments of the present technology, the clustering algorithm 215 may generate the updated second metric parameter 316 based on: a distance between each of the first cluster document vectors 290, a distance between each of the second cluster document vectors 300, a distance between each of the first cluster document vectors 290 and the second cluster document vectors 300, and a size of the third potential cluster 312. Additionally, the clustering algorithm 215 may determine the updated second metric parameter 316 further based on a distance between each of the second cluster document vectors 300 and remaining document vectors of the plurality of documents vectors 220, and a distance between each of the first cluster document vectors 290 and the remaining document vectors of the plurality of documents vectors 220.

The clustering algorithm 215 determines, for the third potential cluster 312 including the first cluster document vectors 290 and the second cluster document vectors 300, an updated combined metric parameter 318 based on the updated first metric parameter 314 and the updated second metric parameter 316.

The clustering algorithm 215 compares the updated combined metric parameter 318 with the combined metric parameter 298 of the first cluster 292 and the combined metric parameter 308 of the second cluster 302.

If the updated combined metric parameter 318 is above both of the combined metric parameter 298 of the first cluster 292 and the combined metric parameter 308 of the second cluster 302, this may indicate that the first cluster documents and the second cluster documents provide complementary information to each other, and do not dilute information vis-à-vis a topic of the single cluster they would form (as opposed to the first cluster 292 and the second cluster 302 being kept apart). On the opposite, if the updated combined metric parameter 318 is below at least one of the respective combined metric parameter 298 and the combined metric parameter 308, this may indicate that the first cluster documents and the second cluster documents should not be merged into a single cluster, as they do not provide complementary information to each other and/or dilute information in the cluster they would form (as opposed to the first cluster 292 and the second cluster 302 being kept apart).

In this non-limiting example, the clustering algorithm 215 determines that the updated combined metric parameter 318 is above both of the combined metric parameter 298 of the first cluster 292, and the combined metric parameter 308 of the second cluster 302. The clustering algorithm 215 merges the first cluster 292 and the second cluster 302 to form a single cluster.

Generally speaking, the clustering application 126 executes the clustering procedure 200 to continue adding documents or merging clusters into an already existing cluster until an updated combined metric parameter is below the combined metric parameters of the existing cluster, which indicates that the documents to be added or clusters to be merged to the already existing do not provide complementary information to each other and/or dilute information about a subject of the cluster they would form. The clustering algorithm 215 then stops the clustering procedure 200 and closes the already existing cluster. The clustering algorithm 215 then restarts the procedure for remaining pairs of documents in the plurality of digital documents 160.

It should be noted that the clustering algorithm 215 is configured to start the clustering procedure 200 by generating updated combined metric parameters for all possible potential clusters that may be formed by two documents of the plurality of digital documents 160, and determines an initial cluster including a given pair of documents having an updated combined metric parameter above other updated combined metric parameters (i.e. the highest updated combined metric parameter). The clustering application 216 may then continue adding documents as described herein above to the initial cluster until an updated combined metric parameter is below the combined metric parameter of the first cluster. The clustering application 216 may then generate a second cluster from all possible potential clusters that may be formed by two remaining documents of the plurality of digital documents 160, and continue the procedure to form the set of clusters 190.

The clustering algorithm 215 then outputs the set of clusters 190, where each respective cluster 195 includes a respective subset of document vectors 197 of the plurality of documents vectors 220, which represent the respective subset of documents 167 of the plurality of digital documents 160. The clustering application 126 then stores, in the news database 124, for each respective document 162, its associated cluster, and/or transmits the information to the news aggregator application 122, which may present at least a portion of the plurality of digital documents 160, which may as an example be sorted by their respective clusters 195.

Figure 3:
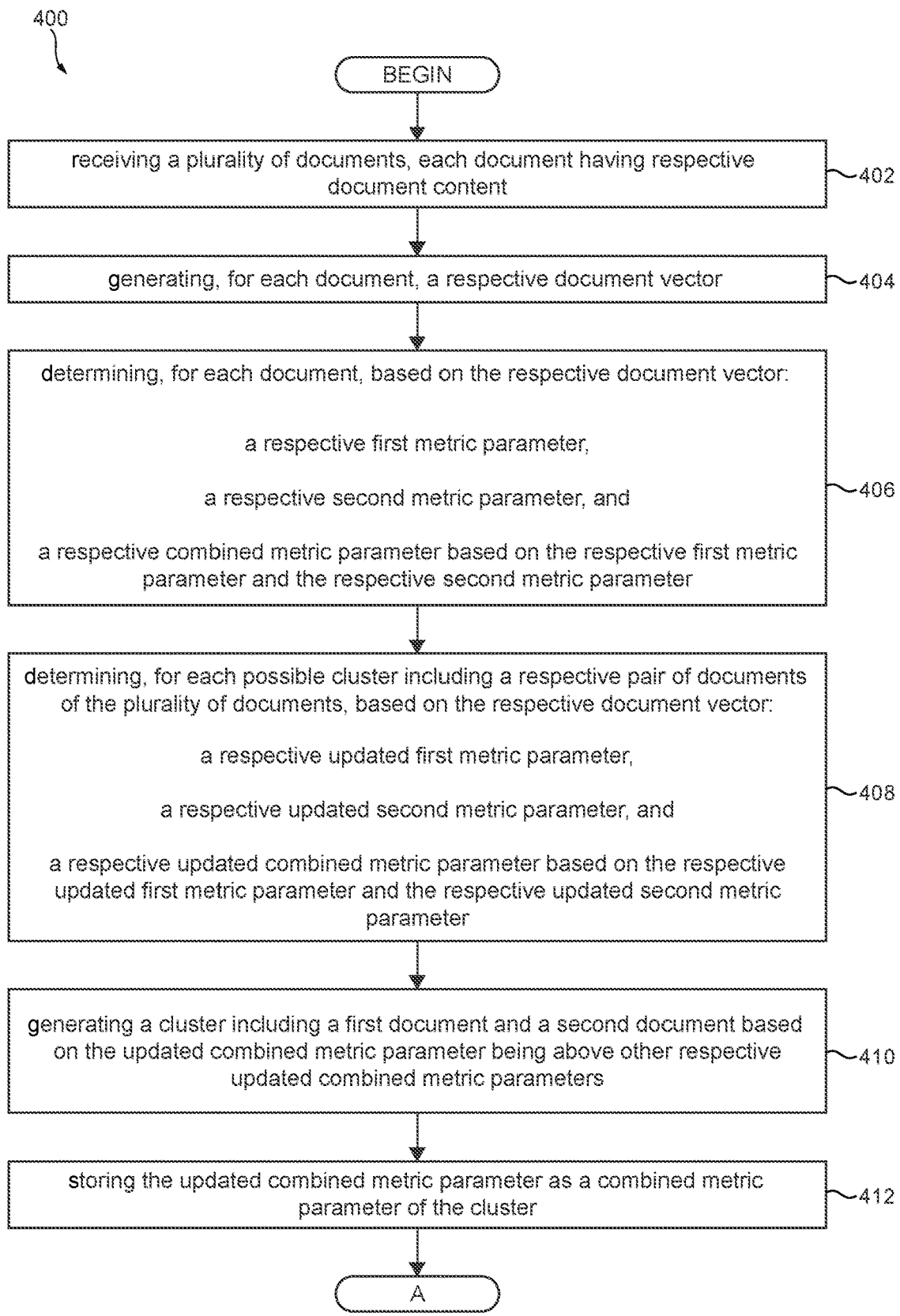
FIGS. 3 to 5 depict a block diagram of a method of clustering documents into a set of cluster based on a combined metric parameter, the method being executed within the system of FIG. 1 in accordance with non-limiting embodiments of the present technology
Figure 4:
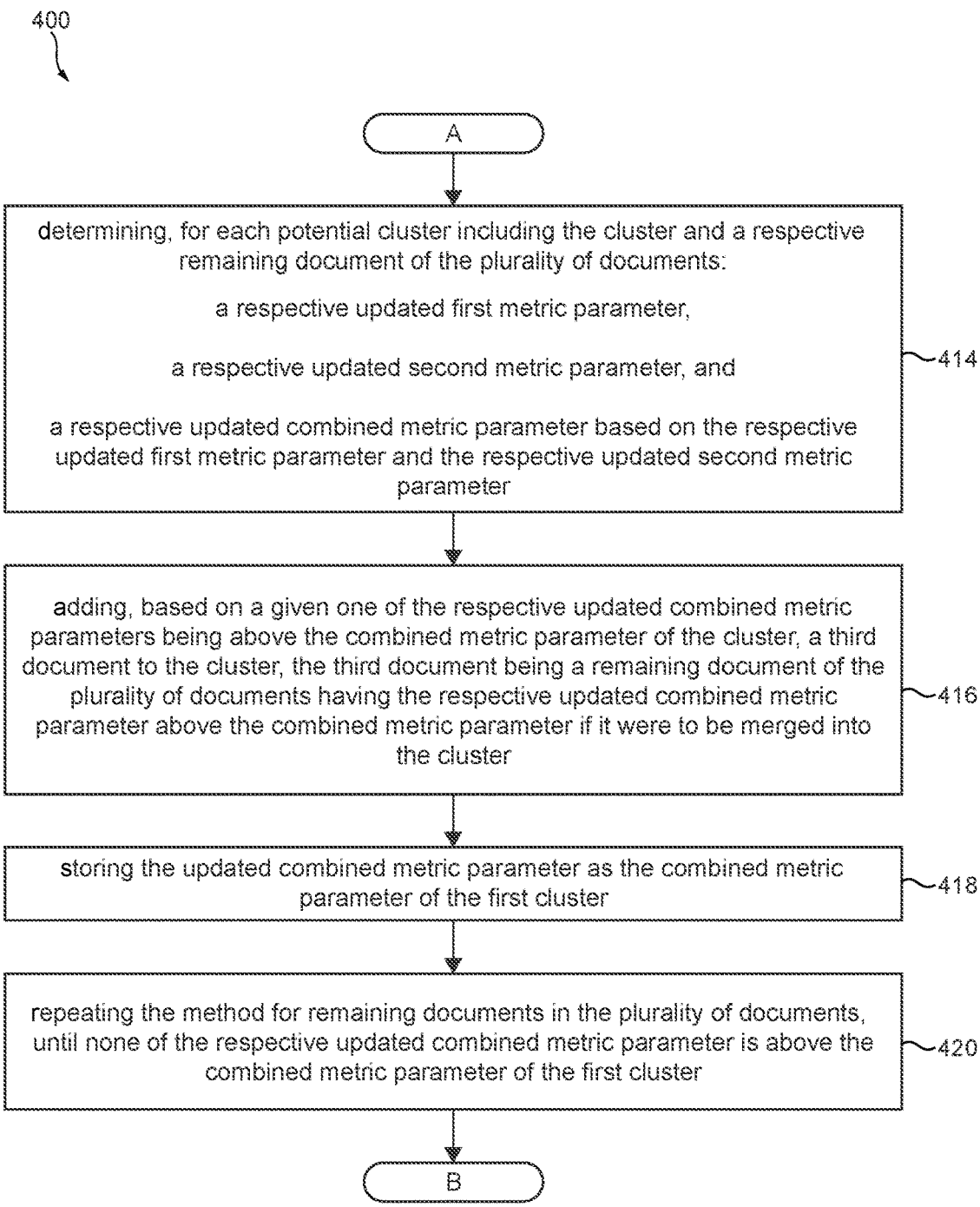

Having described, with reference to FIG. 2, how the clustering application 126 is configured to generate the combined metric parameter based on the first metric parameter and the second metric parameter in accordance with non-limiting embodiments of the present technology, we shall now describe, with reference to FIG. 3 and FIG. 4, methods of clustering documents based on the combined metric parameter.

Figure 5:
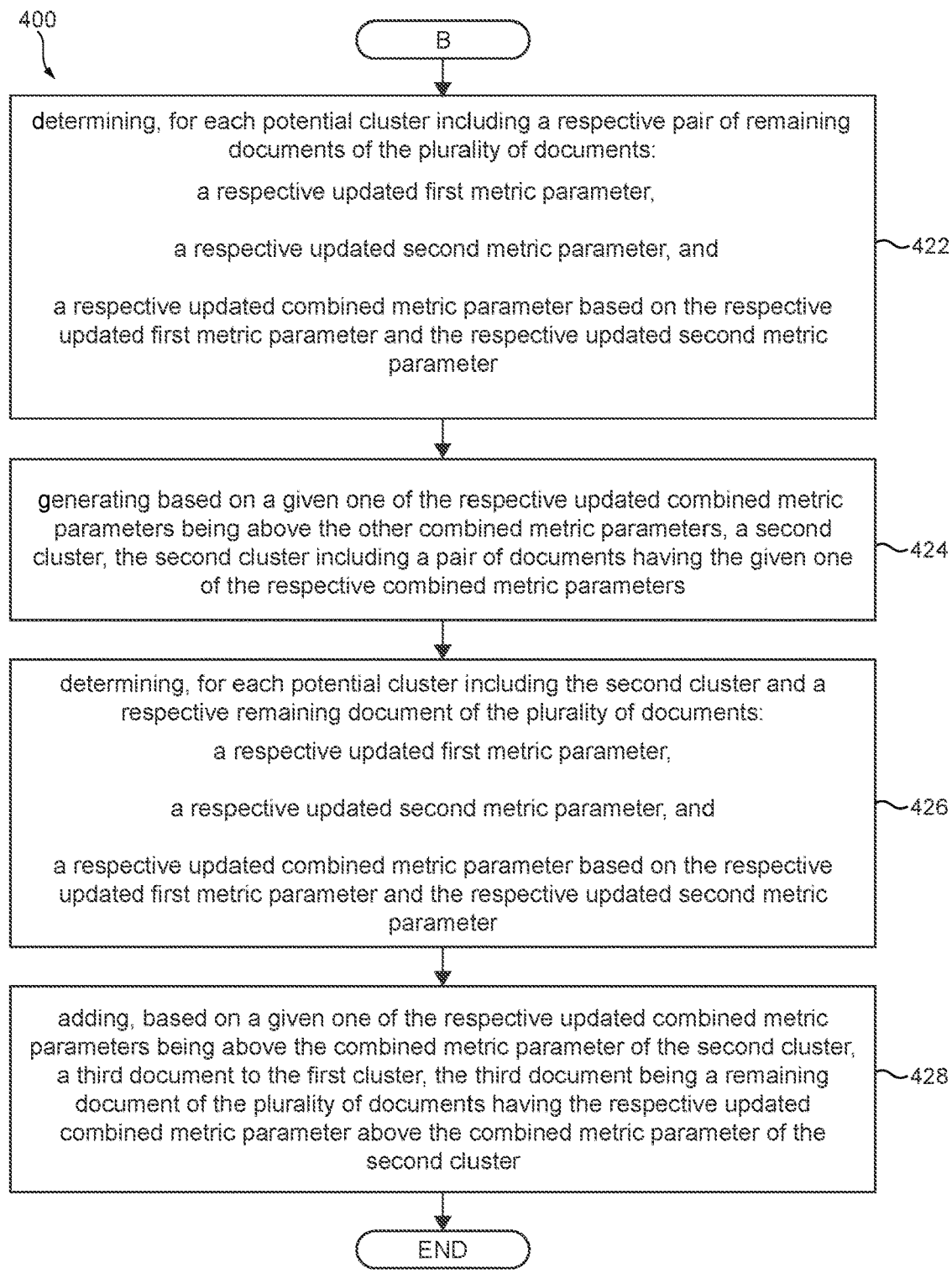

FIGS. 3 to 5 depict a block diagram of a method 400 of clustering documents into a set of cluster based on a combined metric parameter, the method 400 being executed in accordance with non-limiting embodiments of the present technology.

The method 400 is executed by the clustering application 126 of the server 116.

The method 400 begins at step 402.

STEP 402: receiving a plurality of documents, each document having respective document content At step 402, the clustering application 126 receives from the news database 124 the plurality of digital documents 160, each respective document 162 having respective document content 164. The respective document content 164 includes a respective title 166 and respective body content 168.

The method 400 then advances to step 404.

STEP 404: generating, for each document, a respective document vector

At step 404, the clustering application 126 determines, via the vector generation procedure 210, a respective document vector 225 for each respective document 162, based on at least a portion of the respective document content 164. In some embodiments, the clustering application 126 determines the respective document vector 225 based on the document title 166. In other embodiments, the clustering application 126 determines the respective document vector 225 based on the document title 166 and at least a portion of the document body content 168.

The method 400 then advances to step 406.

STEP 406: determining, for each document, based on the respective document vector:
 a respective first metric parameter,
 a respective second metric parameter, and
 a respective combined metric parameter based on the respective first metric parameter and the respective second metric parameter At step 406, the clustering application 126 determines, for each respective document 162 of the plurality of digital documents 160, based on the respective document vector 225, a respective first metric parameter 234, a respective second metric parameter 236, and a respective combined metric parameter 238 based on the respective first metric parameter 234 and the respective second metric parameter 236. In some embodiments, the respective first metric parameter 234 and the respective second metric parameter 236 may have a respective predetermined value.

The method 400 then advances to step 408.

STEP 408: determining, for each possible cluster including a respective pair of documents of the plurality of documents, based on the respective document vector:
 a respective updated first metric parameter,
 a respective updated second metric parameter, and
 a respective updated combined metric parameter based on the respective updated first metric parameter and the respective updated second metric parameter At step 408, the clustering application 126 determines, for each possible potential cluster 252 including a respective pair of documents of the plurality of digital documents 160, based on the given document vector 232, and the other given document vector 242: the respective updated first metric parameter 254, the respective updated first metric parameter 254 being indicative of a degree of complementariness of document content of the respective pair of remaining documents if they were to be united into the potential cluster. The clustering application 126 determines, for each possible potential cluster 252 including a respective pair of documents of the plurality of digital documents 160, based on the given document vector 232, and the other given document vector 242: the respective updated second metric parameter 256, the respective updated second metric parameter 256 being indicative of a degree of dilution of document content in the respective potential cluster. The clustering application 126 determines the respective updated combined metric parameter 258 based on the respective updated first metric parameter 254, and the respective updated second metric parameter 258.

The method 400 then advances to step 410.

STEP 410: generating a cluster including a first document and a second document based on the updated combined metric parameter being above other respective updated combined metric parameters At step 410, the clustering application 126 selects, based on the respective updated combined metric parameter 258 of a given one of the potential clusters 252 being above the respective updated combined metric parameters of other potential clusters 252, a first document and second document represented by cluster document vectors 270 to generate the cluster 272.

STEP 412: storing the updated combined metric parameter as a combined metric parameter of the cluster At step 412, the clustering application 126 stores the updated combined metric parameter 258 as the combined metric parameter 278 of the cluster 272.

The method 400 then advances to step 414

STEP 414: determining, for each potential cluster including the cluster and a respective remaining document of the plurality of documents:
  a respective updated first metric parameter,
  a respective updated second metric parameter, and
  a respective updated combined metric parameter based on the respective updated first metric parameter and the respective updated second metric parameter At step 414, the clustering application 126 determines, for each potential cluster 282 including the cluster 272 and a respective remaining document of the plurality of digital documents 160 (i.e. the plurality of digital documents 160 without the first document and the second document), based on the cluster document vectors 270 and a remaining document vector: the respective updated first metric parameter 284, the respective updated second metric parameter 286, and the respective updated combined metric parameter 288 based on the respective updated first metric parameter 284, and the respective updated second metric parameter 286.

The method 400 then advances to step 416.

STEP 416: adding, based on a given one of the respective updated combined metric parameters being above the combined metric parameter of the cluster, a third document to the cluster, the third document being a remaining document of the plurality of documents having the respective updated combined metric parameter above the combined metric parameter if it were to be merged into the cluster At step 416, the clustering application 126 adds, based on a given one of the respective updated combined metrics parameters associated with a given potential cluster including the cluster 272 and a respective remaining document, a third document (represented by a third document vector 262) to the cluster 272 to generate the first cluster 292, where the third document is a remaining document of the plurality of digital documents 160 (i.e. not including the first document and the second document) having the given one of the respective updated combined metrics parameters above the combined metric parameter of the cluster 272.

In some embodiments of the present technology, more than one potential cluster may have a respective updated combined metric parameter 288 above the combined metric parameter 278 of the cluster 272, in which case the clustering application 126 may select a potential cluster having a respective updated combined metric parameter above the other respective updated combined metric parameters, that is also above the combined metric parameter of the cluster 272. The clustering application 126 may then add the third document (represented by a third document vector 262) to the cluster 272 to generate the first cluster 292. The method 400 then advances to step 418.

In other embodiments of the present technology, none of the respective updated combined metric parameters may be above the combined metric parameter of the cluster 272. The clustering application 126 may consider the cluster 272 as being full, and "close" the cluster 272, and the method 400 may advance to step 422.

STEP 418: storing the updated combined metric parameter as the combined metric parameter of the first cluster At step 418, the clustering application 126 stores the updated combined metric parameter 288 as a combined metric parameter 298 of the first cluster 292. In some embodiments, the clustering algorithm may also store the updated first metric parameter 284 and the updated second metric parameter 286 respectively as a first metric parameter 294 and a second metric parameter 296 of the first cluster 292.

The method 400 then advances to step 420.

STEP 420: repeating the method for remaining documents in the plurality of documents, until none of the respective updated combined metric parameter is above the combined metric parameter of the first cluster At step 420, the clustering application 126 may continue adding remaining documents of the plurality of digital documents 160 to the cluster 272 by repeating steps 414 and 416 for the first cluster 292 until none of the updated combined metric parameters of the potential clusters are above the combined metric parameter of the first cluster 292. The clustering application 126 may then consider the first cluster 292 as being full, and close the first cluster 292.

The method 400 then advances to step 422.

STEP 422: determining, for each potential cluster including a respective pair of remaining documents of the plurality of documents:
  a respective updated first metric parameter, the respective updated first metric parameter being indicative of a degree of complementariness of document content of the respective pair of documents if they were to be united into the potential cluster,
  a respective updated second metric parameter, the respective updated second metric parameter being indicative of a degree of dilution of the document content between the respective pair of documents if they were to be united into the potential cluster, and
  a respective updated combined metric parameter based on the respective updated first metric parameter and the respective updated second metric parameter.

At step 422, clustering application 126 determines, for each possible potential cluster 252 including a respective pair of remaining documents of the plurality of digital documents 160, based on the respective document vectors: the respective updated first metric parameter 254, the respective updated second metric parameter 256, and the respective updated combined metric parameter 258 based on the respective updated first metric parameter 254, and the respective updated second metric parameter 258. The remaining documents of the plurality of digital documents 160 do not include documents in the cluster 272.

The method then advances to step 424.

STEP 424: generating based on a given one of the respective updated combined metric parameters being above the other combined metric parameters, a second cluster, the second cluster including a pair of documents having the given one of the respective combined metric parameters At step 424, the clustering application 126 selects, based on the respective updated combined metric parameter 258 of one of the potential clusters 252 being above respective updated combined metric parameters 258 of other potential clusters 252, a first remaining document and a second remaining document to form a second cluster 302. The clustering application 126 stores the respective updated combined metric parameter 258 as the combined metric parameter 308 of the second cluster 302.

The method then advances to step 426.

STEP 426: determining, for each potential cluster including the second cluster and a respective remaining document of the plurality of documents:
 a respective updated first metric parameter,
 a respective updated second metric parameter, and
 a respective updated combined metric parameter based on the respective updated first metric parameter and the respective updated second metric parameter.

At step 426, the clustering application 126 determines, for each potential cluster 282 including the second cluster 302 and a respective remaining document of the plurality of digital documents 160 (i.e. the plurality of digital documents 160 without documents in the cluster 272), based on the respective document vectors 225: a respective updated first metric parameter, a respective updated second metric parameter, and a respective updated combined metric parameter based on the respective updated first metric parameter, and the respective updated second metric parameter.

The method 400 then advances to step 428.

STEP 428: adding, based on a given one of the respective updated combined metric parameters being above the combined metric parameter of the second cluster, a third document to the first cluster, the third document being a remaining document of the plurality of documents having the respective updated combined metric parameter above the combined metric parameter of the second cluster.

At step 428, the clustering application 126 adds, based on a given one of the respective updated combined metrics parameters being above the combined metric parameter of the second cluster, a third document to the second cluster, where the third document is a remaining document of the plurality of digital documents 160 (i.e. not including the first document and the second document) having the given one of the respective updated combined metrics parameters in the potential cluster that if it were to be united in the second cluster 302. Generally, the given one of the respective updated combined metric parameters is above the combined metric parameter of the second cluster 302.

In some embodiments of the present technology, more than one potential cluster may have a respective updated combined metric parameter above the combined metric parameter of the second cluster 302, and the clustering application 126 may select a potential cluster having a respective updated combined metric parameter above the other respective updated combined metric parameter. The clustering application 126 may then add the third remaining document to the second cluster 302, and store the respective updated combined metric parameter as the combined metric parameter 308 of second cluster 302. The clustering application 126 then repeats steps 406 to 426 to form a set of clusters 190, the set of clusters 190 including at least the first cluster 292 and the second cluster 302.

In other embodiments of the present technology, none of the respective updated combined metric parameters may be above the combined metric parameter of the second cluster 302. The clustering application 126 may consider the second cluster 302 as being full, and close the second cluster 302. The clustering application 126 then repeats steps 406 to 428 to form a set of clusters 190, the set of clusters 190 including at least the first cluster 292 and the second cluster 302.

Figure 6:
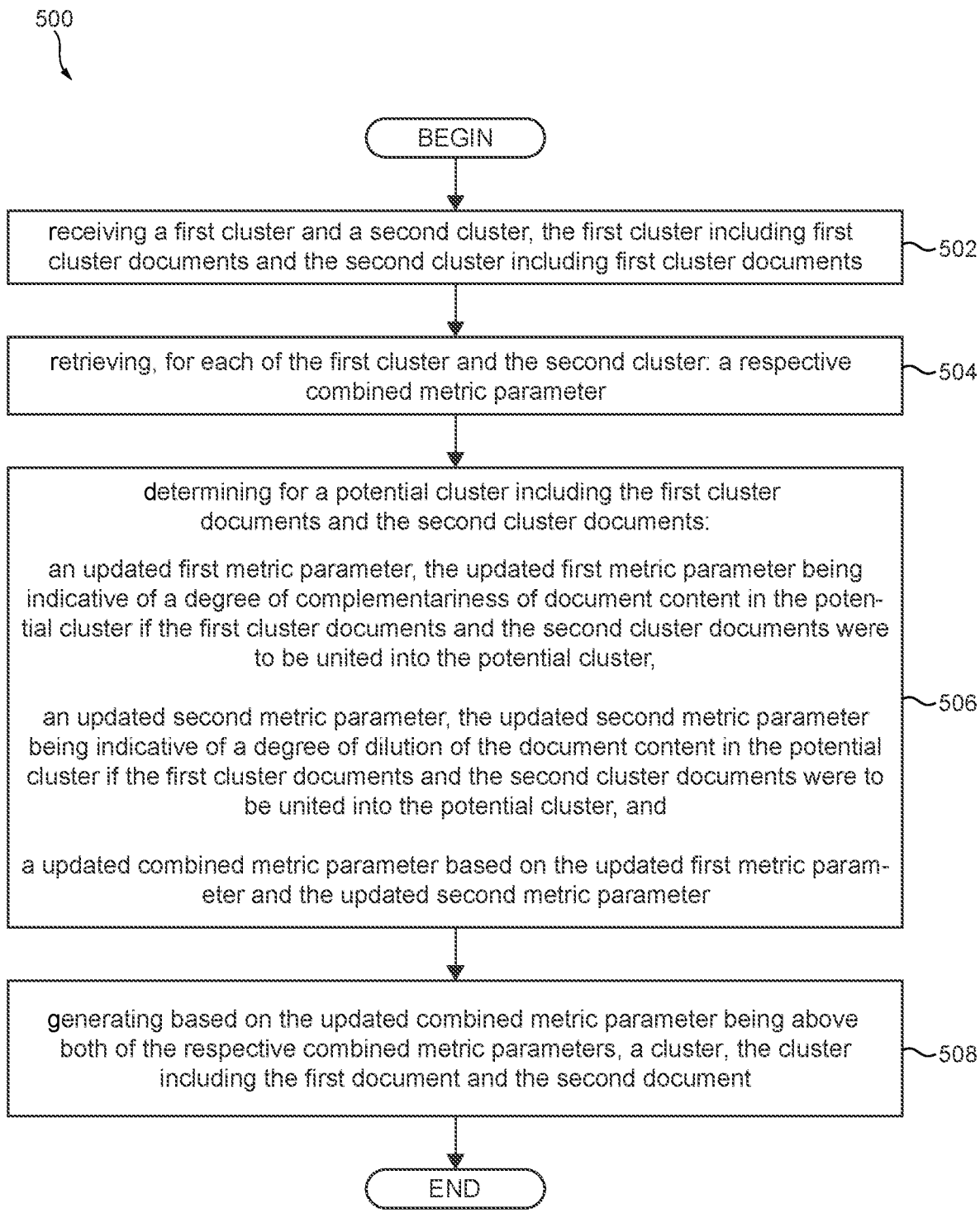
FIG. 6 depicts a block diagram of a method of clustering a first cluster and second cluster into a cluster based on a combined metric parameter, the method being executed within the system of FIG. 1 in accordance with non-limiting embodiments of the present technology

Now turning to FIG. 6, there is depicted a block diagram of a method 500 of clustering the first cluster 292 and the second cluster 302.

The method 500 is executed by the clustering application 126 of the server 116.

The method 500 begins at step 502.

STEP 502: receiving a first cluster and a second cluster, the first cluster including first cluster documents and the second cluster including first cluster documents At step 502, the clustering application 126 the clustering application 126 receives from the news database 124 the first cluster 292 and the second cluster 302. The first cluster 292 includes first cluster document vectors 290 representing the first cluster documents, and the second cluster 302 includes second cluster document vectors 300 representing the second cluster documents.

The method then advances to step 504.

STEP 504: retrieving, for each of the first cluster and the second cluster: a respective combined metric parameter The clustering application 126 retrieves the combined metric parameter 298 of the first cluster 292 from the server memory 118, the news database 124 or another volatile or non-volatile memory (not depicted). In some embodiments, the clustering application 126 may retrieve the first metric parameter 294 and the second metric parameter 296 and generate the combined metric parameter 298 based on the first metric parameter 294 and the second metric parameter 296.

The clustering application 126 retrieves the combined metric parameter 308 of the second cluster 302 from the server memory 118, the news database 124 or another volatile or non-volatile memory (not depicted). In some embodiments, the clustering application 126 may retrieve the first metric parameter 304 and the second metric parameter 306 and generate the combined metric parameter 308 of the second cluster 302 based on the first metric parameter 304 and the second metric parameter 306.

The method 500 then advances to step 506.

STEP 506: determining for a potential cluster including the first cluster documents and the second cluster documents:
 an updated first metric parameter, the updated first metric parameter being indicative of a degree of complementariness of document content in the potential cluster if the first cluster documents and the second cluster documents were to be united into the potential cluster,
 an updated second metric parameter, the updated second metric parameter being indicative of a degree of dilution of the document content in the potential cluster if the first cluster documents and the second cluster documents were to be united into the potential cluster, and an updated combined metric parameter based on the updated first metric parameter and the updated second metric parameter.

At step 506, the clustering algorithm 215 determines, for a third potential cluster 312 including the first cluster 292 and the second cluster 302, based on the first cluster document vectors 290 and the second cluster document vectors 300, an updated first metric parameter 314, the updated first metric parameter 314 being indicative of a degree of complementariness of the first cluster documents and the first cluster documents if they were into a single cluster.

The clustering algorithm 215 determines, for a third potential cluster 312 including the first cluster 292 and the second cluster 302, based on the first cluster document vectors 290 and the second cluster document vectors 300, an updated second metric parameter 316, the updated second metric parameter being indicative of a degree of dilution of document content in if the first cluster documents and the first cluster documents if they were to be united into the single cluster.

The clustering algorithm 215 determines, for the third potential cluster 312 including the first cluster document vectors 290 and the second cluster document vectors 300, an updated combined metric parameter 318 based on the updated first metric parameter 314 and the updated second metric parameter 316.

The method advances to step 508.

STEP 508: generating based on the updated combined metric parameter being above both of the respective combined metric parameters, a cluster, the cluster including the first document and the second document At step 508, the clustering application 126 compares the updated combined metric parameter 318 with the respective combined metric parameter 298, and the respective combined metric parameter 308, and in response to the updated combined metric parameter 318 being above both of the respective combined metric parameter 298, and the respective combined metric parameter 308, the clustering application generates a cluster including the first cluster documents and the second cluster documents.

If the updated combined metric parameter 318 is below at least one of the respective combined metric parameter 298, and the respective combined metric parameter 308, the clustering application 126 may keep the first cluster 292 and the second cluster 302 as separate clusters.

The clustering application 126 may repeat steps 502 to 508 for a plurality of clusters (not depicted), until the updated combined metric parameter is below at least one of the respective metric parameters.

The method 500 may then end.

It is also envisioned that the present technology may be modified and used in combination with other clustering techniques, as an example to evaluate information complementariness and information dilution in cluster(s) that have been generated via other methods.

It should be apparent to those skilled in the art that at least some embodiments of the present technology aim to expand a range of technical solutions for addressing a particular technical problem, namely improving resource usage on a server, by clustering document more efficiently, as well as saving bandwidth and resources on client devices, by providing more representative documents for a given topic or event to users, and thus preventing the need for users to browse through all documents to learn about given topic or event.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for generating clusters of documents using a clustering algorithm, each cluster of the clusters of documents having documents that share at least one common topic,
the method executable by a server, the server executing the clustering algorithm, the method comprising:
receiving, by the server, a first document and a second document, the first document and the second document having respective document content;
determining, by the server, for a potential cluster including the first document and the second document:
an updated first metric parameter, the updated first metric parameter being indicative of a degree of complementariness of document content in the potential cluster if the first document and the second document were to be merged into the potential cluster,
an updated second metric parameter, the updated second metric parameter being indicative of a degree of dilution of the document content in the potential cluster if the first document and the second document were to be merged into the potential cluster, and
an updated combined metric parameter based on the updated first metric parameter and the updated second metric parameter;
generating, by the server, based on the updated combined metric parameter, a cluster, the cluster including the first document and the second document.

2. The method of claim 1, wherein the method further comprises, prior to the determining for the potential cluster the updated first metric parameter:
determining, for each of the first document and the second document, a respective first metric parameter, a respective second metric parameter, and a respective combined metric parameter based on the respective first metric parameter and the respective second metric parameter;
and wherein the generating the cluster is executed in response to the updated combined metric parameter of the potential cluster being above at least one of: the respective combined metric parameters of either one of (i) the first document and (ii) the second document.

3. The method of claim 2, wherein:
the cluster is a first cluster;
the receiving comprises receiving a plurality of documents, each respective document of the plurality of documents having respective document content, the plurality of documents including the first document and the second document;
the determining comprises determining a respective updated first metric parameter, a respective updated second metric parameter, and a respective updated combined metric parameter for each possible potential cluster including a respective pair of documents from the plurality of documents; and
the generating based on the updated combined metric parameter the first cluster including the first document and the second document is further based on the updated combined metric parameter of the potential cluster including the first document and the second document being above the respective updated combined metric parameters of remaining potential clusters including the respective pair of documents from the plurality of documents.

4. The method of claim 3, further comprising:
determining, by the server, for each potential cluster including documents from the first cluster and a respective remaining document of the plurality of documents:
a respective updated first metric parameter, the respective updated first metric parameter being indicative of a degree of complementariness of document content in the potential cluster if the respective remaining document was to be merged with the documents of the first cluster into the potential cluster,
a respective updated second metric parameter, the respective updated second metric parameter being indicative of a degree of dilution of the document content in the potential cluster if the respective remaining document was to be united with the documents of the first cluster into the potential cluster, and
a respective updated combined metric parameter based on the respective updated first metric parameter and the respective updated second metric parameter;
in response to a given one of the respective updated combined metric parameters being above the combined metric parameter of the first cluster, adding a third document to the first cluster, the third document being one of the remaining document of the plurality of documents having the given one of the respective updated combined metric parameters above the combined metric parameter of the first cluster if it was to be merged with the documents of the first cluster; and
storing, by the server, the given one of the respective updated combined metric parameters as the combined metric parameter of the first cluster.

5. The method of claim 4, further comprising:
repeating the method for remaining documents of the plurality of documents until all of the respective updated combined metric parameters are below the combined metric parameter of the first cluster; and
in response to all of the respective metric parameters being below the combined metric parameter of the first cluster, closing the first cluster.

6. The method of claim 5,
wherein after receiving the plurality of documents, the method further comprises:
generating, by the server, a respective document vector for each respective document of the plurality of documents based on at least a portion of the respective document content of the respective document; and
wherein the determining the respective first metric parameter for the respective potential cluster is based on:
respective distances between respective document vectors in the respective potential cluster; and
wherein the determining the respective updated second metric parameter for the respective potential cluster is based on:
the respective distances between respective document vectors in the respective potential cluster, and
a respective size of the respective potential cluster.

7. The method of claim 6,
wherein the determining the updated first metric parameter is further based on:
respective distances between the respective document vectors of the first cluster,
respective distances between the respective document vectors of the second cluster, and
respective distances between the respective document vectors of the first cluster and the second cluster; and
wherein the determining the updated second metric parameter for the respective potential cluster is based on:
the respective distances between the respective document vectors of the first cluster,
the respective distances between the respective document vectors of the second cluster,
the respective distances between the respective document vectors of the first cluster and the second cluster, and
a size of the potential cluster, the size of the potential cluster being a sum of respective sizes of the first cluster and the second cluster.

8. The method of claim 3, further comprising:
based on all of the respective updated combined metric parameters being below the combined metric parameter of the first cluster, closing the first cluster without adding the third document.

9. The method of claim 8, further comprising:
determining, by the server, for each potential cluster including a respective pair of remaining documents of the plurality of documents, the remaining documents not including the documents in the first cluster:
a respective first metric parameter, the respective first metric parameter being indicative of a degree of complementariness of document content of the respective pair of remaining documents if they were to be merged into the potential cluster,
a respective second metric parameter, the potential updated second metric parameter being indicative of a degree of dilution of the document content in the respective potential cluster if the respective pair of remaining documents were to be merged into the potential cluster, and
a respective updated combined metric parameter based on the respective first metric parameter and the respective second metric parameter;
generating, by the server, based on a given one of the respective updated combined metric parameters being above the respective updated combined metric parameters of remaining potential clusters, a second cluster, the second cluster including a pair of documents having the given one of the respective combined metric parameters if they were to be merged; and storing, by the server, the given one of the respective combined metric parameters as a combined metric parameter of the second cluster.

10. The method of claim 9, further comprising repeating the method for remaining documents in the plurality of documents to obtain a set of clusters, the set of clusters including at least the first cluster, and the second cluster.

11. The method of claim 9, wherein the first cluster and the second cluster have a respective combined metric parameter; and wherein the generating the cluster is in response to the updated combined metric parameter being above both of: the respective combined metric parameter of the first cluster, and the respective combined metric parameter of the second cluster.

12. The method of claim 3, further comprising:
determining, by the server, for each potential cluster including documents from the second cluster, and a respective remaining document of the plurality of documents:
a respective first metric parameter, the respective first metric parameter being indicative of a degree of complementariness of document content in the potential cluster if the respective remaining document was to be merged with documents of the second cluster,
a respective second metric parameter, the respective second metric parameter being indicative of a degree of dilution of the document content in the potential cluster if the respective remaining document was to be merged with the documents of the second cluster, and
a respective updated combined metric parameter based on the respective first metric parameter and the respective second metric parameter;
adding, by the server, based on a given one of the respective updated combined metric parameters being above the combined metric parameter of the second cluster, a fourth document to the second cluster, the fourth document being a remaining document of the plurality of documents having the given one of the respective updated combined metric parameters above the combined metric parameter of the second cluster if it was to be merged with the documents of the second cluster; and
storing, by the server, the given one of the respective updated combined metric parameters as the combined metric parameter of the second cluster.

13. The method of claim 12, further comprising, in response to the combined metric parameter being below both of: the respective combined metric parameter of the first cluster, and the respective combined metric parameter of the second cluster:
keeping the first cluster and the second cluster as separate clusters.

14. The method of claim 1, further comprising:
storing, by the server, the updated combined metric parameter as the combined metric parameter of the cluster.

15. The method of claim 1, wherein: the first document is a first cluster containing a plurality of first cluster documents, and the second document is a second cluster containing a plurality of second cluster documents.

16. The method of claim 1, wherein the respective document content includes: a respective title of the respective document, and a respective body content of the respective document.

17. A system for generating clusters of documents using a clustering algorithm, each cluster of the clusters of documents having documents that share at least one common topic,
the system comprising:
a processor;
a non-transitory computer-readable medium comprising instructions;
the processor, upon executing the instructions, being configured to:
receive a first document and a second document, the first document and the second document having respective document content;
determine for a potential cluster including the first document and the second document:
an updated first metric parameter, the updated first metric parameter being indicative of a degree of complementariness of document content in the potential cluster if the first document and the second document were to be merged into the potential cluster,
an updated second metric parameter, the updated second metric parameter being indicative of a degree of dilution of the document content in the potential cluster if the first document and the second document were to be merged into the potential cluster, and
an updated combined metric parameter based on the updated first metric parameter and the updated second metric parameter;
generate based on the updated combined metric parameter, a cluster, the cluster including the first document and the second document.

* * * * *